US012095275B2

(12) United States Patent
Telefus et al.

(10) Patent No.: US 12,095,275 B2
(45) Date of Patent: Sep. 17, 2024

(54) INTELLIGENT ENERGY SOURCE MONITORING AND SELECTION CONTROL SYSTEM

(71) Applicant: Amber Semiconductor, Inc., Dublin, CA (US)

(72) Inventors: Mark Telefus, Orinda, CA (US); Chris Casey, San Francisco, CA (US)

(73) Assignee: Amber Semiconductor, Inc., Dublin, CA (US)

( * ) Notice: Subject to any disclaimer, the term of this patent is extended or adjusted under 35 U.S.C. 154(b) by 0 days.

(21) Appl. No.: 18/135,494

(22) Filed: Apr. 17, 2023

(65) Prior Publication Data

US 2023/0253799 A1    Aug. 10, 2023

Related U.S. Application Data

(63) Continuation of application No. 17/400,088, filed on Aug. 11, 2021, now Pat. No. 11,670,946.
(Continued)

(51) Int. Cl.
*H02J 3/46* (2006.01)
*B60L 53/60* (2019.01)
(Continued)

(52) U.S. Cl.
CPC .............. *H02J 3/466* (2020.01); *B60L 53/60* (2019.02); *H02J 3/381* (2013.01);
(Continued)

(58) Field of Classification Search
CPC ...... H02J 3/466; H02J 3/381; H02J 13/00002; H02J 13/00007; H02J 2300/22;
(Continued)

(56) References Cited

U.S. PATENT DOCUMENTS 3,638,102 A    1/1972 Pelka
3,777,253 A    12/1973 Callan
(Continued)

FOREIGN PATENT DOCUMENTS

CN    102449572 A    5/2012
CN    104836321 A    8/2015
(Continued)

OTHER PUBLICATIONS

U.S. Appl. No. 17/958,319 filed in the name of Damon Baker on Sep. 30, 2022, and entitled "Intelligent Electrical Switches.".
(Continued)

*Primary Examiner* — Lincoln D Donovan
*Assistant Examiner* — Alex W Lam
(74) *Attorney, Agent, or Firm* — Ryan, Mason & Lewis, LLP

(57) ABSTRACT

Systems and methods are provided for intelligent energy source monitoring and selection control to enable power delivery in a multi-modal energy system. A multi-modal energy system includes a control system, power supply systems, and an electrical distribution system. The power supply systems are coupled to the control system. The power supply systems include a mains utility power system and at least one renewable power system. The electrical power distribution system is coupled to the control system. The control system is configured to monitor each power supply system to determine a power availability of each power supply system, determine an amount of power usage by the electrical power distribution system, and selectively connect and disconnect one or more of the power supply systems to the electrical power distribution system based on the determined power availability of the power supply systems and the determined power usage of the electrical power distribution system.

20 Claims, 8 Drawing Sheets

Related U.S. Application Data

(60) Provisional application No. 63/064,399, filed on Aug. 11, 2020.

(51) Int. Cl.
*H02J 3/38* (2006.01)
*H02J 13/00* (2006.01)

(52) U.S. Cl.
CPC .. *H02J 13/00002* (2020.01); *H02J 13/00007* (2020.01); *H02J 2300/22* (2020.01); *H02J 2300/28* (2020.01); *H02J 2300/30* (2020.01)

(58) Field of Classification Search
CPC .... H02J 2300/28; H02J 2300/30; H02J 3/388; H02J 2300/40; H02J 2310/12; H02J 3/32; H02J 7/35; H02J 3/007; H02J 3/472; B60L 53/60; B60L 53/51; B60L 53/52; B60L 53/54; B60L 55/00; Y02T 10/70; Y02T 90/12; Y02T 10/7072; Y04S 40/121; Y04S 10/126; Y02E 60/00
See application file for complete search history.

(56) References Cited

U.S. PATENT DOCUMENTS

| | | | |
|---|---|---|---|
| 4,074,345 A | 2/1978 | Ackermann |
| 4,127,895 A | 11/1978 | Krueger |
| 4,245,148 A | 1/1981 | Gisske et al. |
| 4,245,184 A | 1/1981 | Billings et al. |
| 4,245,185 A | 1/1981 | Mitchell et al. |
| 4,257,081 A | 3/1981 | Sauer et al. |
| 4,466,071 A | 8/1984 | Russell, Jr. |
| 4,487,458 A | 12/1984 | Janutka |
| 4,581,540 A | 4/1986 | Guajardo |
| 4,631,625 A | 12/1986 | Alexander et al. |
| 4,636,907 A | 1/1987 | Howell |
| 4,649,302 A | 3/1987 | Damiano et al. |
| 4,653,084 A | 3/1987 | Ahuja |
| 4,682,061 A | 7/1987 | Donovan |
| 4,685,046 A | 8/1987 | Sanders |
| 4,709,296 A | 11/1987 | Hung et al. |
| 4,760,293 A | 7/1988 | Hebenstreit |
| 4,766,281 A | 8/1988 | Buhler |
| 4,812,995 A | 3/1989 | Girgis et al. |
| 4,888,504 A | 12/1989 | Kinzer |
| 5,121,282 A | 6/1992 | White |
| 5,161,107 A | 11/1992 | Mayeaux et al. |
| 5,276,737 A | 1/1994 | Micali |
| 5,307,257 A | 4/1994 | Fukushima |
| 5,371,646 A | 12/1994 | Biegelmeier |
| 5,410,745 A | 4/1995 | Friesen et al. |
| 5,559,656 A | 9/1996 | Chokhawala |
| 5,646,514 A | 7/1997 | Tsunetsugu |
| 5,654,880 A | 8/1997 | Brkovic et al. |
| 5,731,732 A | 3/1998 | Williams |
| 5,793,596 A | 8/1998 | Jordan et al. |
| 5,796,274 A | 8/1998 | Willis et al. |
| 5,844,759 A | 12/1998 | Hirsh et al. |
| 5,870,009 A | 2/1999 | Serpinet et al. |
| 5,933,305 A | 8/1999 | Schmalz et al. |
| 6,041,322 A | 3/2000 | Meng et al. |
| 6,081,123 A | 6/2000 | Kasbarian et al. |
| 6,111,494 A | 8/2000 | Fischer et al. |
| 6,115,267 A | 9/2000 | Herbert |
| 6,141,197 A | 10/2000 | Kim et al. |
| 6,160,689 A | 12/2000 | Stolzenberg |
| 6,167,329 A | 12/2000 | Engel et al. |
| 6,169,391 B1 | 1/2001 | Lei |
| 6,188,203 B1 | 2/2001 | Rice et al. |
| 6,300,748 B1 | 10/2001 | Miller |
| 6,369,554 B1 | 4/2002 | Aram |
| 6,483,290 B1 | 11/2002 | Hemminger et al. |
| 6,515,434 B1 | 2/2003 | Biebl |
| 6,538,906 B1 | 3/2003 | Ke et al. |
| 6,756,998 B1 | 6/2004 | Bilger |
| 6,788,512 B2 | 9/2004 | Vicente et al. |
| 6,807,035 B1 | 10/2004 | Baldwin et al. |
| 6,813,720 B2 | 11/2004 | Leblanc |
| 6,839,208 B2 | 1/2005 | Macbeth et al. |
| 6,843,680 B2 | 1/2005 | Gorman |
| 6,906,476 B1 | 6/2005 | Beatenbough et al. |
| 6,984,988 B2 | 1/2006 | Yamamoto |
| 7,045,723 B1 | 5/2006 | Projkovski |
| 7,053,626 B2 | 5/2006 | Monter et al. |
| 7,110,225 B1 | 9/2006 | Hick |
| 7,148,796 B2 | 12/2006 | Joy et al. |
| 7,164,238 B2 | 1/2007 | Kazanov et al. |
| 7,297,603 B2 | 11/2007 | Robb et al. |
| 7,304,828 B1 | 12/2007 | Shvartsman |
| D558,683 S | 1/2008 | Pape et al. |
| 7,319,574 B2 | 1/2008 | Engel |
| D568,253 S | 5/2008 | Gorman |
| 7,367,121 B1 | 5/2008 | Gorman |
| 7,586,285 B2 | 9/2009 | Gunji |
| 7,595,680 B2 | 9/2009 | Morita et al. |
| 7,610,616 B2 | 10/2009 | Masuouka et al. |
| 7,633,727 B2 | 12/2009 | Zhou et al. |
| 7,643,256 B2 | 1/2010 | Wright et al. |
| 7,693,670 B2 | 4/2010 | Durling et al. |
| 7,715,216 B2 | 5/2010 | Liu et al. |
| 7,729,147 B1 | 6/2010 | Wong et al. |
| 7,731,403 B2 | 6/2010 | Lynam et al. |
| 7,746,677 B2 | 6/2010 | Unkrich |
| 7,821,023 B2 | 10/2010 | Yuan et al. |
| D638,355 S | 5/2011 | Chen |
| 7,936,279 B2 | 5/2011 | Tang et al. |
| 7,948,719 B2 | 5/2011 | Xu |
| 8,124,888 B2 | 2/2012 | Etemad-Moghadam et al. |
| 8,256,675 B2 | 9/2012 | Baglin et al. |
| 8,295,950 B1 | 10/2012 | Wordsworth et al. |
| 8,374,729 B2 | 2/2013 | Chapel et al. |
| 8,463,453 B2 | 6/2013 | Parsons, Jr. |
| 8,482,885 B2 | 7/2013 | Billingsley et al. |
| 8,560,134 B1 | 10/2013 | Lee |
| 8,649,883 B2 | 2/2014 | Lu et al. |
| 8,664,886 B2 | 3/2014 | Ostrovsky |
| 8,717,720 B2 | 5/2014 | DeBoer |
| 8,718,830 B2 | 5/2014 | Smith |
| 8,781,637 B2 | 7/2014 | Eaves |
| 8,817,441 B2 | 8/2014 | Callanan |
| 8,890,371 B2 | 11/2014 | Gotou |
| D720,295 S | 12/2014 | Dodal et al. |
| 8,947,838 B2 | 2/2015 | Yamai et al. |
| 9,054,587 B2 | 6/2015 | Neyman |
| 9,055,641 B2 | 6/2015 | Shteynberg et al. |
| 9,287,792 B2 | 3/2016 | Telefus et al. |
| 9,325,516 B2 | 4/2016 | Pera et al. |
| 9,366,702 B2 | 6/2016 | Steele et al. |
| 9,439,318 B2 | 9/2016 | Chen |
| 9,443,845 B1 | 9/2016 | Stafanov et al. |
| 9,502,832 B1 | 11/2016 | Ullahkhan et al. |
| 9,509,083 B2 | 11/2016 | Yang |
| 9,515,560 B1 | 12/2016 | Telefus et al. |
| 9,577,420 B2 | 2/2017 | Ostrovsky et al. |
| 9,621,053 B1 | 4/2017 | Telefus |
| 9,774,182 B2 | 9/2017 | Phillips |
| 9,836,243 B1 | 12/2017 | Chanler et al. |
| D814,424 S | 4/2018 | DeCosta |
| 9,965,007 B2 | 5/2018 | Amelio et al. |
| 9,990,786 B1 | 6/2018 | Ziraknejad |
| 9,991,633 B2 | 6/2018 | Robinet |
| 10,072,942 B2 | 9/2018 | Wootton et al. |
| 10,076,006 B2 | 9/2018 | Kahlman et al. |
| 10,101,716 B2 | 10/2018 | Kim |
| 10,186,027 B1 | 1/2019 | Hicken et al. |
| 10,187,944 B2 | 1/2019 | MacAdam et al. |
| 10,469,077 B2 | 11/2019 | Telefus et al. |
| 10,548,188 B2 | 1/2020 | Cheng et al. |
| D879,056 S | 3/2020 | Telefus |
| D881,144 S | 4/2020 | Telefus |
| 10,615,713 B2 | 4/2020 | Telefus et al. |
| 10,645,536 B1 | 5/2020 | Barnes et al. |
| 10,756,662 B2 | 8/2020 | Steiner et al. |

(56) References Cited

U.S. PATENT DOCUMENTS

| | | |
|---|---|---|
| 10,812,072 B2 | 10/2020 | Telefus et al. |
| 10,812,282 B2 | 10/2020 | Telefus et al. |
| 10,819,336 B2 | 10/2020 | Telefus et al. |
| 10,834,792 B2 | 11/2020 | Telefus et al. |
| 10,887,447 B2 | 1/2021 | Jakobsson et al. |
| 10,931,473 B2 | 2/2021 | Telefus et al. |
| 10,936,749 B2 | 3/2021 | Jakobsson |
| 10,951,435 B2 | 3/2021 | Jakobsson |
| 10,985,548 B2 | 4/2021 | Telefus |
| 10,992,236 B2 | 4/2021 | Telefus et al. |
| 10,993,082 B2 | 4/2021 | Jakobsson |
| 11,050,236 B2 | 6/2021 | Telefus et al. |
| 11,056,981 B2 | 7/2021 | Telefus |
| 11,064,586 B2 | 7/2021 | Telefus et al. |
| 11,114,947 B2 | 9/2021 | Telefus et al. |
| 11,170,964 B2 | 11/2021 | Telefus et al. |
| 2002/0109487 A1 | 8/2002 | Telefus et al. |
| 2003/0052544 A1 | 3/2003 | Yamamoto et al. |
| 2003/0063420 A1 | 4/2003 | Pahl et al. |
| 2003/0151865 A1 | 8/2003 | Maio |
| 2004/0032756 A1 | 2/2004 | Van Den Bossche |
| 2004/0251884 A1 | 12/2004 | Steffie et al. |
| 2005/0162139 A1 | 7/2005 | Hirst |
| 2005/0185353 A1 | 8/2005 | Rasmussen et al. |
| 2005/0286184 A1 | 12/2005 | Campolo |
| 2006/0285366 A1 | 12/2006 | Radecker et al. |
| 2007/0008747 A1 | 1/2007 | Soldano et al. |
| 2007/0143826 A1 | 6/2007 | Sastry et al. |
| 2007/0159745 A1 | 7/2007 | Berberich et al. |
| 2007/0188025 A1 | 8/2007 | Keagy et al. |
| 2007/0217237 A1 | 9/2007 | Salvestrini |
| 2007/0232347 A1 | 10/2007 | Persson et al. |
| 2007/0236152 A1 | 10/2007 | Davis et al. |
| 2008/0006607 A1 | 1/2008 | Boeder et al. |
| 2008/0136581 A1 | 6/2008 | Heilman et al. |
| 2008/0151444 A1 | 6/2008 | Upton |
| 2008/0174922 A1 | 7/2008 | Kimbrough |
| 2008/0180866 A1 | 7/2008 | Wong |
| 2008/0204950 A1 | 8/2008 | Zhou et al. |
| 2008/0234879 A1 | 9/2008 | Fuller et al. |
| 2008/0253153 A1 | 10/2008 | Wu et al. |
| 2008/0281472 A1 | 11/2008 | Podgorny et al. |
| 2009/0034139 A1 | 2/2009 | Martin |
| 2009/0067201 A1 | 3/2009 | Cai |
| 2009/0168273 A1 | 7/2009 | Yu et al. |
| 2009/0195349 A1 | 8/2009 | Frader-Thompson et al. |
| 2009/0203355 A1 | 8/2009 | Clark |
| 2009/0213629 A1 | 8/2009 | Liu et al. |
| 2009/0284385 A1 | 11/2009 | Tang et al. |
| 2010/0036903 A1 | 2/2010 | Ahmad et al. |
| 2010/0091418 A1 | 4/2010 | Xu |
| 2010/0145479 A1 | 6/2010 | Griffiths |
| 2010/0145542 A1 | 6/2010 | Chapel et al. |
| 2010/0156369 A1 | 6/2010 | Kularatna et al. |
| 2010/0188054 A1 | 7/2010 | Asakura et al. |
| 2010/0231135 A1 | 9/2010 | Hum et al. |
| 2010/0231373 A1 | 9/2010 | Romp |
| 2010/0235896 A1 | 9/2010 | Hirsch |
| 2010/0244730 A1 | 9/2010 | Nerone |
| 2010/0261373 A1 | 10/2010 | Roneker |
| 2010/0284207 A1 | 11/2010 | Watanabe et al. |
| 2010/0296207 A1 | 11/2010 | Schumacher et al. |
| 2010/0309003 A1 | 12/2010 | Rousseau |
| 2010/0320840 A1 | 12/2010 | Fridberg |
| 2011/0062936 A1 | 3/2011 | Bartelous |
| 2011/0121752 A1 | 5/2011 | Newman, Jr. et al. |
| 2011/0127922 A1 | 6/2011 | Sauerlaender |
| 2011/0156610 A1 | 6/2011 | Ostrovsky et al. |
| 2011/0273103 A1 | 11/2011 | Hong |
| 2011/0292703 A1 | 12/2011 | Cuk |
| 2011/0299547 A1 | 12/2011 | Diab et al. |
| 2011/0301894 A1 | 12/2011 | Sanderford, Jr. |
| 2011/0305054 A1 | 12/2011 | Yamagiwa et al. |
| 2011/0307447 A1 | 12/2011 | Sabaa et al. |
| 2012/0026632 A1 | 2/2012 | Acharya et al. |
| 2012/0075897 A1 | 3/2012 | Fujita |
| 2012/0080942 A1* | 4/2012 | Carralero .............. H02J 3/381 |
| | | 307/24 |
| 2012/0089266 A1 | 4/2012 | Tomimbang et al. |
| 2012/0095605 A1* | 4/2012 | Tran .................. G05D 23/1923 |
| | | 700/285 |
| 2012/0133289 A1 | 5/2012 | Hum et al. |
| 2012/0275076 A1 | 11/2012 | Shono |
| 2012/0311035 A1 | 12/2012 | Guha et al. |
| 2013/0051102 A1 | 2/2013 | Huang et al. |
| 2013/0057247 A1 | 3/2013 | Russell et al. |
| 2013/0063851 A1 | 3/2013 | Stevens et al. |
| 2013/0066478 A1 | 3/2013 | Smith |
| 2013/0088160 A1 | 4/2013 | Chai et al. |
| 2013/0104238 A1 | 4/2013 | Balsan et al. |
| 2013/0119958 A1 | 5/2013 | Gasperi |
| 2013/0128396 A1 | 5/2013 | Danesh et al. |
| 2013/0170261 A1 | 7/2013 | Lee et al. |
| 2013/0174211 A1 | 7/2013 | Aad et al. |
| 2013/0187631 A1 | 7/2013 | Russell et al. |
| 2013/0245841 A1 | 9/2013 | Ahn et al. |
| 2013/0253898 A1 | 9/2013 | Meagher et al. |
| 2013/0261821 A1 | 10/2013 | Lu et al. |
| 2013/0265041 A1 | 10/2013 | Friedrich et al. |
| 2013/0300534 A1 | 11/2013 | Myllymaki |
| 2013/0329331 A1 | 12/2013 | Erger et al. |
| 2014/0043732 A1 | 2/2014 | McKay et al. |
| 2014/0049117 A1* | 2/2014 | Rahman ............ H02J 13/00004 |
| | | 307/82 |
| 2014/0067137 A1 | 3/2014 | Amelio et al. |
| 2014/0074730 A1 | 3/2014 | Arensmeier et al. |
| 2014/0085940 A1 | 3/2014 | Lee et al. |
| 2014/0096272 A1 | 4/2014 | Makofsky et al. |
| 2014/0097809 A1 | 4/2014 | Follic et al. |
| 2014/0159593 A1 | 6/2014 | Chu et al. |
| 2014/0164294 A1 | 6/2014 | Osann, Jr. |
| 2014/0203718 A1 | 7/2014 | Yoon et al. |
| 2014/0246926 A1 | 9/2014 | Cruz et al. |
| 2014/0266698 A1 | 9/2014 | Hall et al. |
| 2014/0268935 A1 | 9/2014 | Chiang |
| 2014/0276753 A1 | 9/2014 | Wham et al. |
| 2014/0331278 A1 | 11/2014 | Tkachev |
| 2014/0357228 A1 | 12/2014 | Luft et al. |
| 2015/0019726 A1 | 1/2015 | Zhou et al. |
| 2015/0042274 A1 | 2/2015 | Kim et al. |
| 2015/0055261 A1 | 2/2015 | Lubicki et al. |
| 2015/0097430 A1 | 4/2015 | Scruggs |
| 2015/0116886 A1 | 4/2015 | Zehnder et al. |
| 2015/0154404 A1 | 6/2015 | Patel et al. |
| 2015/0155789 A1 | 6/2015 | Freeman et al. |
| 2015/0180469 A1 | 6/2015 | Kim |
| 2015/0185261 A1 | 7/2015 | Frader-Thompson et al. |
| 2015/0185262 A1 | 7/2015 | Song et al. |
| 2015/0216006 A1 | 7/2015 | Lee et al. |
| 2015/0236587 A1 | 8/2015 | Kim et al. |
| 2015/0253364 A1 | 9/2015 | Hieda et al. |
| 2015/0256355 A1 | 9/2015 | Pera et al. |
| 2015/0256665 A1 | 9/2015 | Pera et al. |
| 2015/0282223 A1 | 10/2015 | Wang et al. |
| 2015/0309521 A1 | 10/2015 | Pan |
| 2015/0317326 A1 | 11/2015 | Bandarupalli et al. |
| 2015/0355649 A1 | 12/2015 | Ovadia |
| 2015/0362927 A1 | 12/2015 | Giorgi |
| 2015/0382153 A1 | 12/2015 | Otis et al. |
| 2016/0012699 A1 | 1/2016 | Lundy |
| 2016/0018800 A1 | 1/2016 | Gettings et al. |
| 2016/0035159 A1 | 2/2016 | Ganapathy Achari et al. |
| 2016/0050530 A1 | 2/2016 | Corbalis et al. |
| 2016/0057841 A1 | 2/2016 | Lenig |
| 2016/0069933 A1 | 3/2016 | Cook et al. |
| 2016/0077746 A1 | 3/2016 | Muth et al. |
| 2016/0079757 A1* | 3/2016 | Matan .................. G01R 11/54 |
| | | 307/24 |
| 2016/0081143 A1 | 3/2016 | Wang |
| 2016/0095099 A1 | 3/2016 | Yang et al. |
| 2016/0105814 A1 | 4/2016 | Hurst et al. |
| 2016/0110154 A1 | 4/2016 | Qureshi et al. |
| 2016/0117917 A1 | 4/2016 | Prakash et al. |
| 2016/0126031 A1 | 5/2016 | Wootton et al. |

(56) References Cited

U.S. PATENT DOCUMENTS

| | | |
|---|---|---|
| 2016/0156635 A1 | 6/2016 | Liu et al. |
| 2016/0157193 A1 | 6/2016 | Qi et al. |
| 2016/0178691 A1 | 6/2016 | Simonin |
| 2016/0181941 A1 | 6/2016 | Gratton et al. |
| 2016/0195864 A1 | 7/2016 | Kim |
| 2016/0232318 A1 | 8/2016 | Mensinger et al. |
| 2016/0247799 A1 | 8/2016 | Stafanov et al. |
| 2016/0259308 A1 | 9/2016 | Fadell et al. |
| 2016/0260135 A1 | 9/2016 | Zomet et al. |
| 2016/0274864 A1 | 9/2016 | Zomet et al. |
| 2016/0277528 A1 | 9/2016 | Guilaume et al. |
| 2016/0294179 A1 | 10/2016 | Kennedy et al. |
| 2016/0343083 A1 | 11/2016 | Hering et al. |
| 2016/0360586 A1 | 12/2016 | Yang et al. |
| 2016/0374134 A1 | 12/2016 | Kweon et al. |
| 2017/0004948 A1 | 1/2017 | Leyh |
| 2017/0019969 A1 | 1/2017 | O'Neil et al. |
| 2017/0026194 A1 | 1/2017 | Vijayrao et al. |
| 2017/0033942 A1 | 2/2017 | Koeninger |
| 2017/0063225 A1 | 3/2017 | Guo et al. |
| 2017/0067961 A1 | 3/2017 | O'Flynn |
| 2017/0086281 A1 | 3/2017 | Avrahamy |
| 2017/0099647 A1 | 4/2017 | Shah et al. |
| 2017/0104325 A1 | 4/2017 | Eriksen et al. |
| 2017/0134883 A1 | 5/2017 | Lekutai |
| 2017/0168516 A1 | 6/2017 | King |
| 2017/0170730 A1 | 6/2017 | Sugiura |
| 2017/0171802 A1 | 6/2017 | Hou et al. |
| 2017/0179946 A1 | 6/2017 | Turvey |
| 2017/0195130 A1 | 7/2017 | Landow et al. |
| 2017/0212653 A1 | 7/2017 | Kanojia et al. |
| 2017/0214967 A1 | 7/2017 | Xia et al. |
| 2017/0230193 A1 | 8/2017 | Apte et al. |
| 2017/0230939 A1 | 8/2017 | Rudolf et al. |
| 2017/0244241 A1 | 8/2017 | Wilson et al. |
| 2017/0256934 A1 | 9/2017 | Kennedy et al. |
| 2017/0256941 A1 | 9/2017 | Bowers et al. |
| 2017/0256956 A1 | 9/2017 | Irish et al. |
| 2017/0277709 A1 | 9/2017 | Strauss et al. |
| 2017/0314743 A1 | 11/2017 | Del Castillo et al. |
| 2017/0318098 A1 | 11/2017 | Sanghvi et al. |
| 2017/0322049 A1 | 11/2017 | Wootton et al. |
| 2017/0322258 A1 | 11/2017 | Miller et al. |
| 2017/0338809 A1 | 11/2017 | Stefanov et al. |
| 2017/0347415 A1 | 11/2017 | Cho et al. |
| 2017/0366950 A1 | 12/2017 | Arbon |
| 2017/0372159 A1 | 12/2017 | Schimmel |
| 2018/0026534 A1 | 1/2018 | Turcan |
| 2018/0054460 A1 | 2/2018 | Brady et al. |
| 2018/0054862 A1 | 2/2018 | Takagimoto et al. |
| 2018/0061158 A1 | 3/2018 | Greene |
| 2018/0091361 A1 | 3/2018 | Smith et al. |
| 2018/0146369 A1 | 5/2018 | Kennedy, Jr. |
| 2018/0174076 A1 | 6/2018 | Fukami |
| 2018/0196094 A1 | 7/2018 | Fishburn et al. |
| 2018/0201302 A1 | 7/2018 | Sonoda et al. |
| 2018/0254959 A1 | 9/2018 | Mantyjarvi et al. |
| 2018/0285198 A1 | 10/2018 | Dantkale et al. |
| 2018/0287802 A1 | 10/2018 | Brickell |
| 2018/0301006 A1 | 10/2018 | Flint et al. |
| 2018/0307609 A1 | 10/2018 | Qiang et al. |
| 2018/0307859 A1 | 10/2018 | LaFever et al. |
| 2018/0342329 A1 | 11/2018 | Rufo et al. |
| 2018/0359039 A1 | 12/2018 | Daoura et al. |
| 2018/0359223 A1 | 12/2018 | Maier et al. |
| 2019/0003855 A1 | 1/2019 | Wootton et al. |
| 2019/0020477 A1 | 1/2019 | Antonatos et al. |
| 2019/0026493 A1 | 1/2019 | Ukena-Bonfig et al. |
| 2019/0028869 A1 | 1/2019 | Kaliner |
| 2019/0036928 A1 | 1/2019 | Meriac et al. |
| 2019/0050903 A1 | 2/2019 | DeWitt et al. |
| 2019/0052174 A1 | 2/2019 | Gong |
| 2019/0068716 A1 | 2/2019 | Lauer |
| 2019/0086979 A1 | 3/2019 | Kao et al. |
| 2019/0087835 A1 | 3/2019 | Schwed et al. |
| 2019/0104138 A1 | 4/2019 | Storms et al. |
| 2019/0122834 A1 | 4/2019 | Wootton et al. |
| 2019/0140640 A1 | 5/2019 | Telefus et al. |
| 2019/0165691 A1 | 5/2019 | Telefus et al. |
| 2019/0181679 A1 | 6/2019 | Northway et al. |
| 2019/0182617 A1 | 6/2019 | Zamber et al. |
| 2019/0207375 A1 | 7/2019 | Telefus et al. |
| 2019/0222058 A1 | 7/2019 | Sharifipour |
| 2019/0238060 A1 | 8/2019 | Telefus et al. |
| 2019/0245457 A1 | 8/2019 | Telefus et al. |
| 2019/0253243 A1 | 8/2019 | Zimmerman et al. |
| 2019/0268176 A1 | 8/2019 | Pognant |
| 2019/0280887 A1 | 9/2019 | Telefus et al. |
| 2019/0306953 A1 | 10/2019 | Joyce et al. |
| 2019/0334999 A1 | 10/2019 | Ryhorchuk et al. |
| 2019/0355014 A1 | 11/2019 | Gerber |
| 2019/0362101 A1 | 11/2019 | Fisse et al. |
| 2019/0372331 A1 | 12/2019 | Liu et al. |
| 2020/0007126 A1 | 1/2020 | Telefus et al. |
| 2020/0014301 A1 | 1/2020 | Telefus |
| 2020/0014379 A1 | 1/2020 | Telefus |
| 2020/0044883 A1 | 2/2020 | Telefus et al. |
| 2020/0052607 A1 | 2/2020 | Telefus et al. |
| 2020/0053100 A1 | 2/2020 | Jakobsson |
| 2020/0106259 A1 | 4/2020 | Telefus |
| 2020/0106260 A1 | 4/2020 | Telefus |
| 2020/0106637 A1 | 4/2020 | Jakobsson |
| 2020/0120202 A1 | 4/2020 | Jakobsson et al. |
| 2020/0145247 A1 | 5/2020 | Jakobsson |
| 2020/0153245 A1 | 5/2020 | Jakobsson et al. |
| 2020/0159960 A1 | 5/2020 | Jakobsson |
| 2020/0193785 A1 | 6/2020 | Berglund et al. |
| 2020/0196110 A1 | 6/2020 | Jakobsson |
| 2020/0196412 A1 | 6/2020 | Telefus et al. |
| 2020/0200851 A1 | 6/2020 | Homsky et al. |
| 2020/0252299 A1 | 8/2020 | Kaag et al. |
| 2020/0260287 A1 | 8/2020 | Hendel |
| 2020/0275266 A1 | 8/2020 | Jakobsson |
| 2020/0287537 A1 | 9/2020 | Telefus et al. |
| 2020/0314233 A1 | 10/2020 | Mohalik et al. |
| 2020/0328694 A1 | 10/2020 | Telefus et al. |
| 2020/0344596 A1 | 10/2020 | Dong et al. |
| 2020/0365345 A1 | 11/2020 | Telefus et al. |
| 2020/0365346 A1 | 11/2020 | Telefus et al. |
| 2020/0365356 A1 | 11/2020 | Telefus et al. |
| 2020/0366078 A1 | 11/2020 | Telefus et al. |
| 2020/0366079 A1 | 11/2020 | Telefus et al. |
| 2020/0394332 A1 | 12/2020 | Jakobsson et al. |
| 2021/0014947 A1 | 1/2021 | Telefus et al. |
| 2021/0119528 A1 | 4/2021 | Telefus |
| 2021/0173364 A1 | 6/2021 | Telefus et al. |
| 2021/0182111 A1 | 6/2021 | Jakobsson |
| 2021/0185035 A1 | 6/2021 | Fernandez Yu |
| 2021/0226441 A1 | 7/2021 | Telefus et al. |
| 2021/0234356 A1 | 7/2021 | Telefus et al. |
| 2021/0336555 A1 | 10/2021 | Telefus |
| 2021/0345462 A1 | 11/2021 | Telefus et al. |
| 2022/0189721 A1 | 6/2022 | Telefus et al. |

FOREIGN PATENT DOCUMENTS

| | | |
|---|---|---|
| CN | 109428393 A | 3/2019 |
| CN | 109075551 B | 1/2021 |
| EP | 0016646 A1 | 10/1980 |
| EP | 0398026 A2 | 11/1990 |
| EP | 2560063 A1 | 2/2013 |
| GB | 2458699 A | 9/2009 |
| JP | 06-053779 A | 2/1994 |
| JP | 2013230034 A | 11/2013 |
| JP | 2014030355 A | 2/2014 |
| WO | 2010110951 A1 | 9/2010 |
| WO | 2016010529 A1 | 1/2016 |
| WO | 2016110833 A2 | 7/2016 |
| WO | 2017196571 A1 | 11/2017 |
| WO | 2017196572 A1 | 11/2017 |
| WO | 2017196649 A1 | 11/2017 |
| WO | 2018075726 A1 | 4/2018 |
| WO | 2018080604 A1 | 5/2018 |
| WO | 2018080614 A1 | 5/2018 |

(56) References Cited

FOREIGN PATENT DOCUMENTS

| WO | 2018081619 A2 | 5/2018 |
|---|---|---|
| WO | 2018081619 A3 | 5/2018 |
| WO | 2018159914 A1 | 9/2018 |
| WO | 2019133110 A1 | 7/2019 |
| WO | 2020014158 A1 | 1/2020 |
| WO | 2020014161 A1 | 1/2020 |
| WO | PCT/US19/54102 | 2/2020 |
| WO | 2020072516 A1 | 4/2020 |
| WO | PCT/US19/67004 | 4/2020 |
| WO | 2020131977 A1 | 6/2020 |
| WO | PCT/US20/33421 | 9/2020 |
| WO | 2020236726 A1 | 11/2020 |
| WO | PCT/US21/14320 | 4/2021 |
| WO | 2021112870 A1 | 6/2021 |
| WO | 2021150684 A1 | 7/2021 |
| WO | PCT/US21/45624 | 11/2021 |

OTHER PUBLICATIONS

U.S. Appl. No. 17/972,589 filed in the name of Mark Telefus et al. on Oct. 25, 2022, and entitled "Multi-Output Programmable Power Manager.".
F. Stajano et al., "The Resurrecting Duckling: Security Issues for Ad-hoc Wireless Networks," International Workshop on Security Protocols, 1999, 11 pages.
L. Sweeney, "Simple Demographics Often Identify People Uniquely," Carnegie Mellon University, Data Privacy Working Paper 3, 2000, 34 pages.
A. Narayanan et al., "Robust De-anonymization of Large Sparse Datasets," IEEE Symposium on Security and Privacy, May 2008, 15 pages.
M. Alahmad et al., "Non-Intrusive Electrical Load Monitoring and Profiling Methods for Applications in Energy Management Systems," IEEE Long Island Systems, Applications and Technology Conference, 2011, 7 pages.
K. Yang et al. "Series Arc Fault Detection Algorithm Based on Autoregressive Bispecturm Analysis," Algorithms, vol. 8, Oct. 16, 2015, pp. 929-950.
J.-E. Park et al., "Design on Topologies for High Efficiency Two-Stage AC-DC Converter," 2012 IEEE 7th International Power Electronics and Motion Control Conference—ECCE Asia, Jun. 2-5, 2012, China, 6 pages.
S. Cuk, "98% Efficient Single-Stage AC/DC Converter Topologies," Power Electronics Europe, Issue 4, 2011, 6 pages.
E. Carvou et al., "Electrical Arc Characterization for Ac-Arc Fault Applications," 2009 Proceedings of the 55th IEEE Holm Conference on Electrical Contacts, IEEE Explore Oct. 9, 2009, 6 pages.
C. Restrepo, "Arc Fault Detection and Discrimination Methods," 2007 Proceedings of the 53rd IEEE Holm Conference on Electrical Contacts, IEEE Explore Sep. 24, 2007, 8 pages.
K. Eguchi et al., "Design of a Charge-Pump Type AC-DC Converter for RF-ID Tags," 2006 International Symposium on Communications and Information Technologies, F4D-3, IEEE, 2006, 4 pages.
A. Ayari et al., "Active Power Measurement Comparison Between Analog and Digital Methods," International Conference on Electrical Engineering and Software Applications, 2013, 6 pages.
G. D. Gregory et al., "The Arc-Fault Circuit Interrupter, an Emerging Product," IEEE, 1998, 8 pages.
D. Irwin et al., "Exploiting Home Automation Protocols for Load Monitoring in Smart Buildings," BuildSys '11: Proceedings of the Third ACM Workshop on Embedded Sensing Systems for Energy-Efficiency in Buildings, Nov. 2011, 6 pages.
B. Mrazovac et al., "Towards Ubiquitous Smart Outlets for Safety and Energetic Efficiency of Home Electric Appliances," 2011 IEEE International Conference on Consumer Electronics, Berlin, German, Sep. 6-8, 2011, 5 pages.
J. K. Becker et al., "Tracking Anonymized Bluetooth Devices," Proceedings on Privacy Enhancing Technologies, vol. 3, 2019, pp. 50-65.

H. Siadati et al., "Mind your SMSes: Mitigating Social Engineering in Second Factor Authentication," Computers & Security, vol. 65, Mar. 2017, 12 pages.
S. Jerde, "The New York Times Can Now Predict Your Emotions and Motivations After Reading a Story," https://www.adweek.com/tv-video/the-new-york-times-can-now-predict-your-emotions-and-motivations-after-reading-a-story/, Apr. 29, 2019, 3 pages.
K. Mowery et al., "Pixel Perfect: Fingerprinting Canvas in HTML5," Proceedings of W2SP, 2012, 12 pages.
S. Kamkar, "Evercookie," https://samy.pl/evercookie/, Oct. 11, 2010, 5 pages.
M. K. Franklin et al., "Fair Exchange with a Semi-Trusted Third Party," Association for Computing Machinery, 1997, 6 pages.
J. Camenisch et al., "Digital Payment Systems with Passive Anonymity-Revoking Trustees," Journal of Computer Security, vol. 5, No. 1, 1997, 11 pages.
L. Coney et al., "Towards a Privacy Measurement Criterion for Voting Systems," Proceedings of the 2005 National Conference On Digital Government Research, 2005, 2 pages.
L. Sweeney, "k-anonymity: A Model for Protecting Privacy," International Journal of Uncertainty, Fuzziness and Knowledge-Based Systems, vol. 1, No. 5, 2002, 14 pages.
C. Dwork, "Differential Privacy," Encyclopedia of Cryptography and Security, 2011, 12 pages.
A. P. Felt et al., "Android Permissions: User Attention, Comprehension, and Behavior," Symposium on Usable Privacy and Security, Jul. 11-13, 2012, 14 pages.
S. Von Solms et al., "On Blind Signatures and Perfect Crimes," Computers & Security, vol. 11, No. 6, 1992, 3 pages.
R. Wyden, "Wyden Releases Discussion Draft Of Legislation To Provide Real Protections For Americans' Privacy," https://www.wyden.senate.gov/news/press-releases/wyden-releases-discussion-draft-of-legislation-to-provide-real-protections-for-americans-privacy, Nov. 1, 2018, 3 pages.
M. Rubio, "Rubio Introduces Privacy Bill To Protect Consumers While Promoting Innovation," https://www.rubio.senate.gov/public/index.cfm/2019/1/rubio-introduces-privacy-bill-to-protect-consumers-while-promoting-innovation#:%7E:text=Washingt%E2%80%A6, Jan. 16, 2019, 2 pages.
C. Dwork et al., "Differential Privacy and Robust Statistics," 41st ACM Symposium on Theory of Computing, 2009, 10 pages.
J. Camenisch et al., "Compact E-Cash," Eurocrypt, vol. 3494, 2005, pp. 302-321.
D. L. Chaum, "Untraceable Electronic Mail, Return Addresses, and Digital Pseudonyms," Communications of the ACM, vol. 24, No. 2, Feb. 1981, pp. 84-88.
J. Camenisch et al., "An Efficient System For Nontransferable Anonymous Credentials With Optional Anonymity Revocation," International Conference on the Theory and Application of Cryptographic Techniques, May 6-10, 2001, 30 pages.
M. K. Reiter et al., "Crowds: Anonymity For Web Transactions," ACM Transactions on Information and System Security, vol. 1, 1997, 23 pages.
I. Clarke et al., "Freenet: A Distributed Anonymous Information Storage And Retrieval System," International Workshop on Designing Privacy Enhanching Technologies: Design Issues in Anonymity and Unobservability, 2001, 21 pages.
P. Golle et al., "Universal Re-encryption for Mixnets," Lecture Notes in Computer Science, Feb. 2004, 15 pages.
Y. Lindell et al., "Multiparty Computation For Privacy Preserving Data Mining," Journal of Privacy and Confidentiality, May 6, 2008, 39 pages.
J. Hollan et al., "Distributed Cognition: Toward a New Foundation for Human-Computer Interaction Research," ACM Transactions on Computer-Human Interaction, vol. 7, No. 2, Jun. 2000, pp. 174-196.
A. Adams et al., "Users are Not the Enemy," Communications of the ACM, Dec. 1999, 6 pages.
A. Morton et al., "Privacy is a Process, Not a Pet: a Theory for Effective Privacy Practice," Proceedings of the 2012 New Security Paradigms Workshop, Sep. 2012, 18 pages.
G. D. Abowd et al., "Charting Past, Present And Future Research In Ubiquitous Computing," ACM Transactions on Computer—Human Interaction, vol. 7, No. 1, Mar. 2000, pp. 29-58.

(56) References Cited

OTHER PUBLICATIONS

W. Mason et al., "Conducting Behavioral Research on Amazon's Mechanical Turk," Behavior Research Methods, Jun. 2011, 23 pages.

G. M. Gray et al., "Dealing with the Dangers of Fear: The Role of Risk Communication," Health Affairs, Nov. 2002, 11 pages.

L. Shengyuan et al., "Instantaneous Value Sampling AC-DC Converter and its Application in Power Quantity Detection," 2011 Third International Conference on Measuring Technology and Mechatronics Automation, Jan. 6-7, 2011, 4 pages.

H.-H. Chang et al., "Load Recognition for Different Loads with the Same Real Power and Reactive Power in a Non-intrusive Load-monitoring System," 2008 12th International Conference on Computer Supported Cooperative Work in Design, Apr. 16-18, 2008, 6 pages.

\* cited by examiner

INTELLIGENT ENERGY SOURCE MONITORING AND SELECTION CONTROL SYSTEM

CROSS-REFERENCE TO RELATED APPLICATIONS

This application is a Continuation of U.S. patent application Ser. No. 17/400,088, filed on Aug. 11, 2021, which claims the benefit of U.S. Provisional Application No. 63/064,399, filed on Aug. 11, 2020, the disclosures of which are fully incorporated herein by reference.

TECHNICAL FIELD

This disclosure relates generally to techniques for monitoring and controlling power delivery and consumption.

BACKGROUND

Power consumption is constantly increasing as a result of the increased use of powered devices for commercial and residential applications. This increasing power usage is adding significant strain to existing utility power grids and, thus, increasing the demand for alternative ways to provide power, such as solar power, wind power, battery power, and other alternative forms of renewable energy. The use of renewable energy sources allows consumers to save money on energy. In addition, renewable energy systems provide significant benefits to utility power providers as the use of renewable energy systems allows the utility power providers to decrease peak demands and help manage demand response. For this reason, many utility power providers provide rebates to encourage consumers to consume energy in non-peak times and decrease the spike of demand through the use of renewable power systems such as solar power system and battery systems which can sustain a building (e.g., residential house) when utility power is in high demand.

SUMMARY

Exemplary embodiments of the disclosure include systems and methods for providing intelligent energy source monitoring and selection control to enable power delivery in a multi-modal energy source system. For example, in one exemplary embodiment, an apparatus comprises a plurality of power supply channels, a power output channel, a power source selection system, energy monitoring and metering circuitry, and a control system. Each power supply channel is configured to connect to a corresponding power supply system of a plurality of power supply systems, which comprise a mains utility power system and at least one renewable power system. The power output channel is configured to connect to an electric power distribution system. The power source selection system is coupled between the power supply channels and the power output channel. The energy monitoring and metering circuitry is configured to generate metering data which indicates a power availability of each power supply system connected to each power supply channel, and power usage of the electrical power distribution system. The control system is configured to (i) process the metering data to determine the power availability of the power supply systems and the power usage of the electrical power distribution system based on the metering data, and (ii) control the power source selection system to selectively connect and disconnect one or more of the power supply channels to the power output channel, and thereby connect one or more of the power supply systems to the electrical power distribution system, based on the determined power availability of the power supply systems and the power usage of the electrical power distribution system.

Another exemplary embodiment comprises a multi-modal energy system. The multi-modal energy system comprises a control system, a plurality of power supply systems, and an electrical distribution system. The plurality of power supply systems are coupled to the control system, where the power supply systems comprise a mains utility power system and at least one renewable power system. The electrical power distribution system is coupled to the control system. The control system is configured to (i) monitor each power supply system to determine a power availability of each power supply system, (ii) determine an amount of power usage by the electrical power distribution system, and (iii) selectively connect and disconnect one or more of the power supply systems to the electrical power distribution system based on the determined power availability of the power supply systems and the determined power usage of the electrical power distribution system.

Another exemplary embodiment includes a method which comprises monitoring each power supply system of a plurality of power supply systems that are configured to supply power to an electrical power distribution system, to determine a power availability of each power supply system, wherein the power supply systems comprise a mains utility power system and at least one renewable power system; monitoring power usage of the electrical power distribution system to determine an amount of power usage by the electrical power distribution system of each power supply system; and selectively connecting and disconnect one or more of the power supply systems to the electrical power distribution system based on the determined power availability of the power supply systems and the determined power usage by the electrical power distribution system.

Other embodiments will be described in the following detailed description of exemplary embodiments, which is to be read in conjunction with the accompanying figures.

DETAILED DESCRIPTION

Embodiments of the disclosure will now be described in further detail with regard to systems and methods for providing intelligent energy source monitoring and selection control to enable power delivery in a multi-modal energy source system. It is to be understood that same or similar reference numbers are used throughout the drawings to denote the same or similar features, elements, or structures, and thus, a detailed explanation of the same or similar features, elements, or structures will not be repeated for each of the drawings. The term "exemplary" as used herein means "serving as an example, instance, or illustration". Any embodiment or design described herein as "exemplary" is not to be construed as preferred or advantageous over other embodiments or designs.

Further, it is to be understood that the phrase "configured to" as used in conjunction with a circuit, structure, element, component, or the like, performing one or more functions or otherwise providing some functionality, is intended to encompass embodiments wherein the circuit, structure, element, component, or the like, is implemented in hardware, software, and/or combinations thereof, and in implementations that comprise hardware, wherein the hardware may comprise discrete circuit elements (e.g., transistors, inverters, etc.), programmable elements (e.g., ASICs, FPGAs, etc.), processing devices (e.g., CPUs, GPUs, etc.), one or more integrated circuits, and/or combinations thereof. Thus, by way of example only, when a circuit, structure, element, component, etc., is defined to be configured to provide a specific functionality, it is intended to cover, but not be limited to, embodiments where the circuit, structure, element, component, etc., is comprised of elements, processing devices, and/or integrated circuits that enable it to perform the specific functionality when in an operational state (e.g., connected or otherwise deployed in a system, powered on, receiving an input, and/or producing an output), as well as cover embodiments when the circuit, structure, element, component, etc., is in a non-operational state (e.g., not connected nor otherwise deployed in a system, not powered on, not receiving an input, and/or not producing an output) or in a partial operational state.

Figure 1:
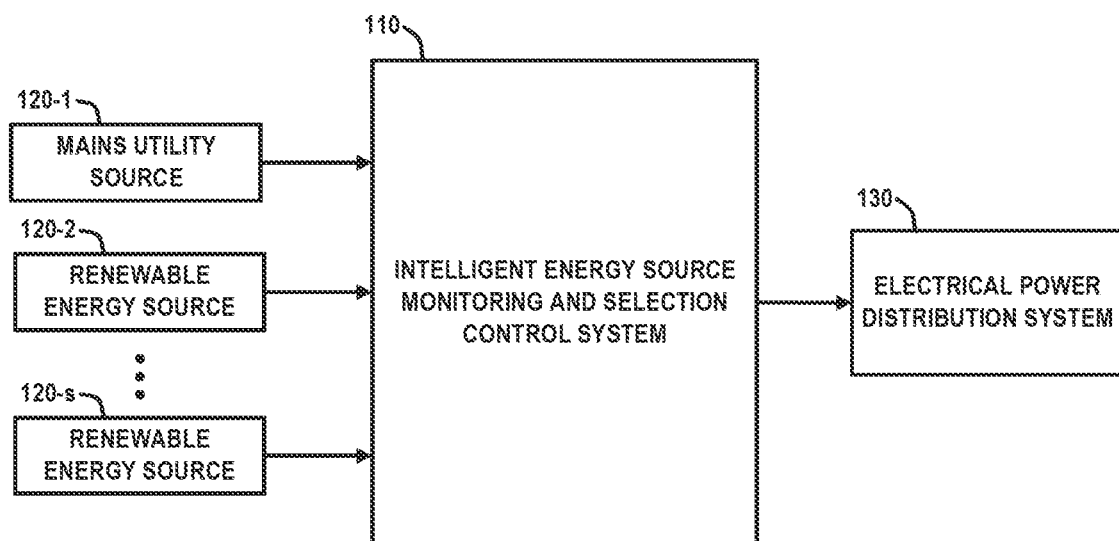
FIG. 1 schematically illustrates a multi-modal energy system which implements an intelligent energy source monitoring and energy source selection control system, according to an exemplary embodiment of the disclosure.

FIG. 1 schematically illustrates a multi-modal energy system which implements an intelligent energy source monitoring and energy source selection control system, according to an exemplary embodiment of the disclosure. In particular, FIG. 1 schematically illustrates a multi-modal energy system 100 which comprises an intelligent energy source monitoring and selection control system 110 (referred to as Energy Traffic Controller™), a plurality of energy sources 120-1, 120-2, . . . , 120-s (collectively, energy sources 120), and an electrical power distribution system 130. The energy sources 120 comprise different types of power supply systems that are configured to generate or otherwise provide power to the electrical power distribution system 130. The energy sources 120 include, but are not limited, to a mains utility source 120-1, and one or more renewable energy sources 120-2, . . . , 120-s which are configured to supply alternating current (AC) power. In some embodiments, the electrical power distribution system 130 comprises an AC electrical distribution system of a building (e.g., residential home, commercial building, industrial building, etc.). In some embodiments, the electrical power distribution system 130 comprises a public, stand-alone, electric vehicle (EV) charging station.

The intelligent energy source monitoring and selection control system 110 is configured as an intelligent switching system which controls the connection of one or more of the available energy sources 120-1, 120-2, . . . , 120-s to the electrical power distribution system 130. The intelligent energy source monitoring and selection control system 110 monitors each of the energy sources 120-1, 120-2, . . . , 120-s using energy metering circuitry to determine power availability, power usage, etc., to make intelligent decisions on which energy source(s) to connect to the electrical power distribution system 130 at any given time.

Figure 2:
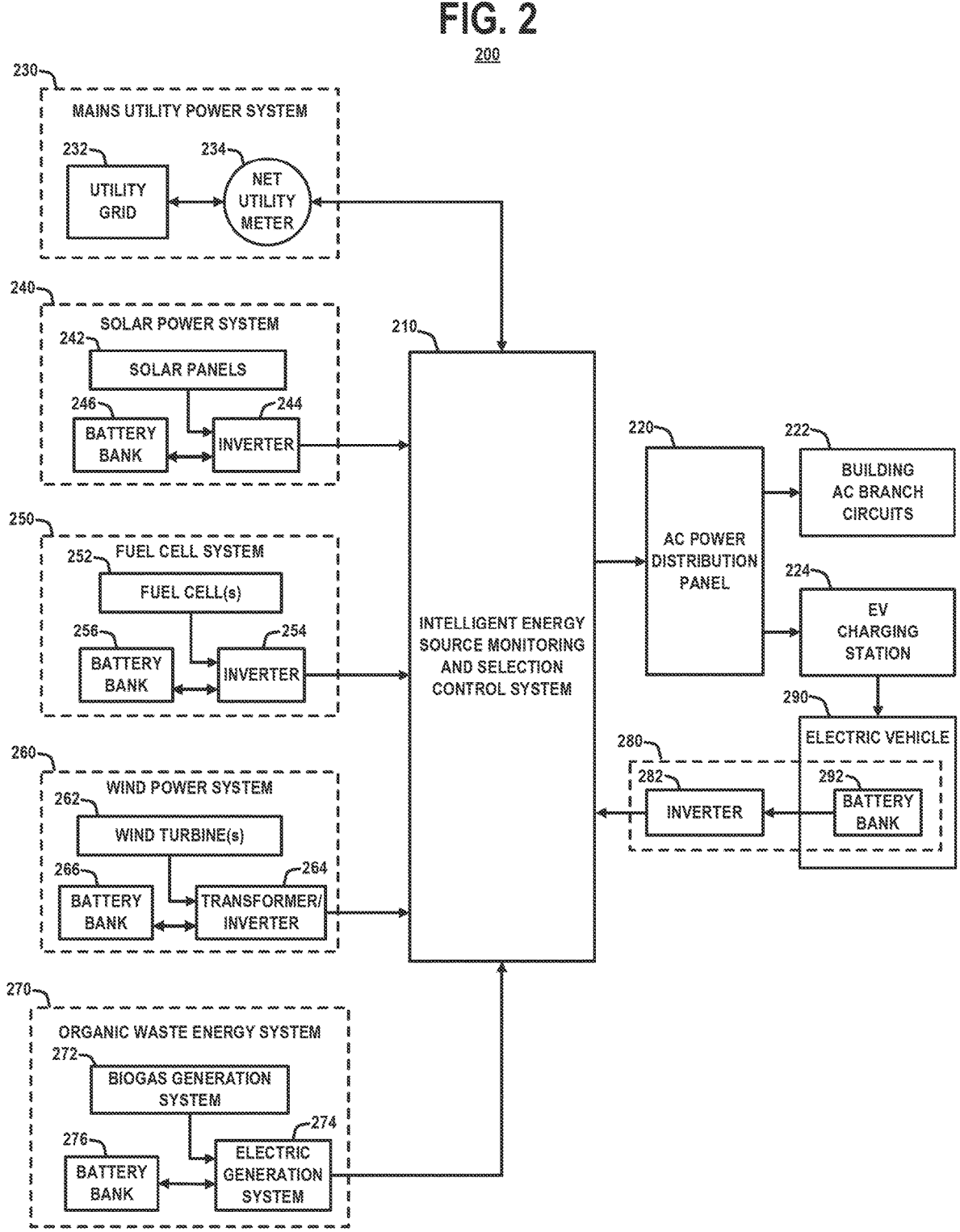
FIG. 2 schematically illustrates a multi-modal energy system which implements an intelligent energy source monitoring and energy source selection control system, according to another exemplary embodiment of the disclosure.

FIG. 2 schematically illustrates a multi-modal energy system which implements an intelligent energy source monitoring and energy source selection control system, according to another exemplary embodiment of the disclosure. In particular, FIG. 2 schematically illustrates a multi-modal energy system 200 which comprises an intelligent energy source monitoring and selection control system 210 that is coupled to an AC power distribution panel 220 of a building (e.g., residential home, commercial building, industrial building, etc.). The AC power distribution panel 220 distributes AC power to AC branch circuits 222 of the building. As further shown in FIG. 2, it is assumed that the building comprises an EV charging station 224 (e.g., hard-wired, portable, etc.) which is connected to the AC power distribution panel 220. A plurality of energy sources (or power supply systems) are connected to the intelligent energy source monitoring and selection control system 210 including a mains utility power system 230, and one or more renewable energy power supply systems including, but not limited to, a solar power system 240, a fuel cell power system 250, a wind power system 260, an organic waste energy system 270, and an electric battery system 280.

The mains utility power system 230 comprises a utility grid 232, and a net utility meter 234. The utility grid 232 distributes power that is generated by centralized power plants (or electric generator stations) of a commercial utility power supply company, and distributes the power to consumers through a distribution system which comprises, e.g., high-voltage transmission lines and towers, medium-voltage transmission lines, transformers, and individual service drops (service lines) from utility poles to customer buildings and other premises. The net utility meter 234 comprises a device which implements net metering functions to record an amount of energy consumed from the mains utility power system 230, and an amount of energy supplied to the mains utility power system 230 in instances where, e.g., one or more of the renewable energy power supply systems 240, 250, 260, 270, etc., comprise an "on-grid" power system which is connected to the utility grid 232. The electricity produced by one or more of the renewable power supply systems 240, 250, 260, and 270, etc., is consumed by loads connected to the building AC branch circuits 222, while excess power that is generated by one of more of the renewable energy sources at any point of time is supplied back to the utility grid 232 for consumption by other customers of the mains utility power system 230. This allows a customer to receive a credit from the utility power company based on the net number of, e.g., kilowatt-hours, that the customer supplied back to the utility grid 232.

In some embodiments, the solar power system 240 comprises an array of solar panels 242, a solar inverter 244, and a battery bank 246. The solar panels 242 convert sunlight into DC power. The DC power is fed into the solar inverter 244. The solar inverter 244 converts the DC power into AC power (e.g., 240V AC, 60 Hz). The intelligent energy source monitoring and selection control system 210 can selectively connect the solar inverter 244 to the AC power distribution panel 220 where the solar inverter 244 supplies regulated AC power to the AC power distribution panel 220 for distribution to the building AC branch circuits 222 and the on-premises EV charging station 224. The intelligent energy source monitoring and selection control system 210 can selectively connect the solar inverter 244 to the utility grid 232 to supply excess AC power, which is generated by the solar power system 240, to the utility grid 232.

In some embodiments, the solar power system 240 comprises a hybrid system which combines an "on-grid" connection to the utility grid 232, and the battery bank 246 which is configured to store excess solar power in DC batteries. More specifically, in a hybrid system, when the solar power system 240 is generating and outputting AC power to the AC power distribution panel 220 for consumption by electric devices and loads connected to the branch circuits 222 and/or EV charging station 224, any excess power generated by the solar power system 240 can be stored in the battery bank 246. Once the battery bank 246 is fully charged, the inverter 244 will stop sending power to the battery bank 246.

In a hybrid system, the solar inverter 244 is configured to (i) redirect DC power from the solar panels 242 to the battery bank 246, (ii) convert DC power from the solar panels 242 into AC power, and (iii) convert stored DC power in the battery bank 246 into AC power which is supplied to the AC power distribution panel 220 and/or utility grid 232, as desired. For example, the stored DC power in the battery bank 246 can be used to power the building during, e.g., peak periods when the cost of utility mains power is relatively high, as compared to off-peak periods. Further, as noted above, if the grid-connected solar power system 240 is producing more power than what the building consumes, the surplus solar power can be fed back into the utility grid 232 and/or a battery bank of another renewable energy system that is connected to the intelligent energy source monitoring and selection control system 210.

When the stored DC energy in the battery bank 246 is depleted, and/or when the solar power system 240 is not generating sufficient solar energy (e.g., at night, cloudy days, etc.), the intelligent energy source monitoring and selection control system 210 can selectively connect another power source (e.g., utility mains, or other available renewable energy source 250, 260, 270, and/or 280) to the AC power distribution panel 220 to supply power to the branch circuits 22 of the building. Furthermore, with a hybrid solar system, the solar inverter 244 can be configured to charge the battery bank 246 using, e.g., cheap off-peak electricity from the mains utility power system 230 or some other available renewable energy source.

Next, the fuel cell system 250 comprises one or more fuel cells 252 (e.g., hydrogen fuel cells), an inverter 254, and a battery bank 256. In some embodiments, the fuel cells 252 comprise hydrogen fuel cells that are configured to produce electrical energy using hydrogen fuel which is supplied from, e.g., a hydrogen fuel storage tank, other otherwise generated by some suitable hydrogen fuel generation system (not specifically shown). In some embodiments, the fuel cells 252 comprise proton exchange membrane fuel cells (PEMFCs). A PEMFC comprises a proton-exchange membrane that is configured to cause the transformation of chemical energy, which is generated by an electrochemical reaction of hydrogen fuel and oxygen, into DC power. The DC power output from the fuel cells 252 is converted to AC power (e.g., 240V AC, 60 Hz) via the inverter 254.

The intelligent energy source monitoring and selection control system 210 can selectively connect the fuel cell system 250 to the AC power distribution panel 220 where the inverter 254 supplies regulated AC power to the AC power distribution panel 220 for distribution to the building AC branch circuits 222 and the on-premises EV charging station 224. The intelligent energy source monitoring and selection control system 210 can selectively connect the inverter 254 to the utility grid 232 to supply excess AC power, which is generated by the fuel cell system 250, to the utility grid 232.

In some embodiments, the fuel cell system 250 comprises a hybrid system which combines an "on-grid" connection to the utility grid 232, and the battery bank 256 which is configured to store excess fuel cell power in DC batteries. More specifically, in the hybrid system, when the fuel cell system 250 is generating and outputting AC power to the AC power distribution panel 220 for consumption by electric devices and loads connected to the branch circuits 222 and/or EV charging station 224, any excess power generated by the fuel cell system 250 can be stored in the battery bank 256. Once the battery bank 256 is fully charged, the inverter 254 will stop sending power to the battery bank 256.

In the hybrid system, the fuel cell system inverter 254 is configured to (i) redirect DC power from the fuel cells 252 to the battery bank 256, (ii) convert DC power from the fuel cells 252 into AC power which is supplied to the AC power distribution panel 220 and/or utility grid 232, and (iii) convert stored DC power in the battery bank 256 into AC power which is supplied to the AC power distribution panel 220 and/or utility grid 232, as desired. For example, the stored DC power in the battery bank 256 can be used to power the building during, e.g., peak periods when the cost of utility mains power is relatively high, as compared to off-peak periods. Further, as noted above, if the grid-connected fuel cell system 250 is producing more power than what the building consumes, the surplus fuel cell power can be fed back into the utility grid 232 and/or a battery bank another renewable energy system that is connected to the intelligent energy source monitoring and selection control system 210.

When the stored DC energy in the battery bank 256 is depleted, and/or when the fuel cell system 250 is not generating DC energy (e.g., hydrogen fuel storage tank depleted), the intelligent energy source monitoring and selection control system 210 can selectively connect another power source (e.g., mains utility, or other available renewable energy source 240, 260, 270, and/or 280) to the AC power distribution panel 220 to supply power to the branch circuits 222 of the building. Furthermore, with a hybrid fuel cell system 250, the inverter 254 can be configured to charge the battery bank 256 using, e.g., cheap off-peak electricity from the mains utility power system 230 or some other available renewable energy source.

Next, the wind power system 260 comprises one or more wind turbines 262 (e.g., a single wind turbine for a small building, or a wind turbine farm for large buildings, etc.), a transformer/inverter 264, and a battery bank 266. In some embodiments, the wind turbines 262 are configured to generate AC power, and in other embodiments, the wind turbines 262 are configured to generate DC power. When the wind turbines 262 are configured to generate AC power (e.g., 600 V AC, 60 Hz), the transformer 264 is configured to step up, or step down, the AC output voltage to be compatible with the AC power requirements of the building which is supplied power by the AC power distribution panel 220. In other embodiments, when the wind turbines 262 are configured to generate DC power, the transformer/inverter 264 converts the DC power into AC power (e.g., 240V AC, 60 Hz).

The intelligent energy source monitoring and selection control system 210 can selectively connect the wind power system 260 to the AC power distribution panel 220 where the inverter transformer/inverter 264 supplies regulated AC power to the AC power distribution panel 220 for distribution to the building AC branch circuits 222 and the on-premises EV charging station 224. The intelligent energy source monitoring and selection control system 210 can selectively connect the transformer/inverter 264 of the wind power system 260 to the utility grid 232 to supply excess AC power, which is generated by the wind power system 260, to the utility grid 232.

In some embodiments, the wind power system 260 comprises a hybrid system which combines an "on-grid" connection to the utility grid 232, and the battery bank 266 which is configured to store excess generated wind power in DC batteries. More specifically, in the hybrid system, when the wind power system 260 is generating and outputting AC power to the AC power distribution panel 220 for consumption by electric devices and loads connected to the branch circuits 222 and/or EV charging station 224, any excess power generated by the wind power system 260 can be stored in the battery bank 266. Once the battery bank 266 is fully charged, the transformer/inverter 264 will stop sending power to the battery bank 266.

In the hybrid system, the transformer/inverter 264 of the wind power system 260 is configured to (i) redirect power generated by the wind turbine 262 to the battery bank 266, (ii) transform/convert AC/DC power from the wind turbine 262 into AC power, and (iii) convert stored DC power in the battery bank 266 into AC power which is supplied to the AC power distribution panel 220 and/or utility grid 232, as desired. For example, the stored DC power in the battery bank 266 can be used to power the building during, e.g., peak periods when the cost of utility mains power is relatively high, as compared to off-peak periods. Further, as noted above, if the grid-connected wind power system 260 is producing more power than what the building consumes, the surplus power generated by the wind power system 260 can be fed back into the utility grid 232 and/or a battery bank of another renewable energy system that is connected to the intelligent energy source monitoring and selection control system 210.

When the stored DC energy in the battery bank 266 is depleted, and/or when the wind power system 260 is not generating AC or DC power (e.g., insufficient wind to turn the blades of the wind turbine 262), the intelligent energy source monitoring and selection control system 210 can selectively connect another power source (e.g., mains utility power system 230, or other available renewable energy power systems 240, 250, 270, and/or 280) to the AC power distribution panel 220 to supply power to the branch circuits 222 of the building. Furthermore, with a hybrid wind power system 260, the transformer/inverter 264 can be configured to charge the battery bank 266 using, e.g., cheap off-peak electricity from the mains utility 230 or some other available renewable energy source.

Next, the organic waste energy system 270 comprises a biogas generation system 272, an electric generation system 274, and a battery bank 276. In some embodiments, the biogas generation system 272 comprises, e.g., an anaerobic digestion system which is configured to biologically process organic waste, such as animal manures and wastes, to generate a biogas such as methane. The biogas is then used to operate the electrical generation system 274 to produce AC power. For example, methane gas generated by the biogas generation system 272 is cleaned and used to power, e.g., a small engine-generator which is configured to generate AC electricity. The electric generation system 272 is configured to generate AC power (e.g., 240V AC, 60 Hz) to match the AC power requirements of the building which is supplied power by the AC power distribution panel 220.

The intelligent energy source monitoring and selection control system 210 can selectively connect the electric generation system 274 of the organic waste energy system 270 to the AC power distribution panel 220 to supply regulated AC power to the AC power distribution panel 220 for distribution to the building AC branch circuits 222 and the on-premises EV charging station 224. The intelligent energy source monitoring and selection control system 210 can selectively connect the electric generation system 274 of the organic waste energy system 270 to the utility grid 232 to supply excess AC power, which is generated electric generation system 272, to the utility grid 232.

In some embodiments, as with the renewable energy sources discussed above, the organic waste energy system 270 comprises a hybrid system which combines an "on-grid" connection to the utility grid 232, and the battery bank 276 which is configured to store excess power. More specifically, in the hybrid system, when the electric generation system 274 of the organic waste energy system 270 is generating and outputting AC power to the AC power distribution panel 220 for consumption by electric devices and loads connected to the branch circuits 222 and/or EV charging station 224, any excess AC power generated by the electric generation system 274 can be converted to DC power and stored in the battery bank 276. Once the battery bank 276 is fully charged, the electric generation system 274 will stop sending power to the battery bank 276.

In the hybrid system, the electric generation system 274 of the organic waste energy system 270 is configured to (i) convert generated AC power to DC power which is stored in the battery bank 276, (ii) generate AC power using biogas (e.g., methane) provided by the biogas generation system 272 which is supplied to the AC power distribution panel 222 and/or the utility grid 232, and (iii) convert stored DC power in the battery bank 276 into AC power which is supplied to the AC power distribution panel 220 and/or utility grid 232, as desired. For example, the stored DC power in the battery bank 276 can be used to power the building during, e.g., peak periods when the cost of utility mains power is relatively high, as compared to off-peak periods. Further, as noted above, if the grid-connected organic waste energy system 270 is producing more power than what the building consumes, the surplus AC power can be fed back into the utility grid 232 and/or a battery bank of another renewable energy system that is connected to the intelligent energy source monitoring and selection control system 210.

When the stored DC energy in the battery bank 276 is depleted, and/or when the organic waste energy system 270 is not generating AC power (e.g., no available biogas), the intelligent energy source monitoring and selection control system 210 can selectively connect another power source (e.g., mains utility 230, or other available renewable energy source 240, 250, 260, and/or 280) to the AC power distribution panel 220 to supply power to the branch circuits 222 of the building. Furthermore, with the hybrid system, electric generation system 272 can be configured to charge the battery bank 276 using, e.g., cheap off-peak electricity from the mains utility power supply system 230 or some other available renewable energy source.

Next, the electric battery system 280 comprises an inverter 282 and a battery bank 292. In an exemplary embodiment, as shown in FIG. 2, the battery bank 292 comprises the battery bank of an electric vehicle 290. The electric vehicle 290 can be a car, truck, heavy-duty fleet vehicle, school bus, public bus, etc., which utilizes the on-premises EV charging station 224 to charge the battery bank 292 of the electric vehicle 290. The electric vehicle 290 could connect to the EV charging station 224 to charge the EV battery bank 292 using AC power supplied to the AC power distribution panel 220 by one or more of the power supply sources 230, 240, 250, 260, and/or 270.

On the other hand, during periods of time when the electric vehicle 290 is not being used, a vehicle-to-grid configuration is implemented where the EV battery bank 292 is used as a renewable power source by connecting the inverter 282 to the EV battery bank 292, and operating the inverter 282 to convert DC power of the EV battery bank 292 into AC power. The intelligent energy source monitoring and selection control system 210 can direct the AC power generated by the inverter 282 to (i) the AC power distribution panel 220 to power the electrical devices and loads connected to the AC branch circuits 222, or (ii) back to the utility grid 232, etc. For example, a vehicle-to-grid configuration can be particularly beneficial in instances where, e.g., heavy-duty fleet vehicles, such as buses or utility vehicles, which have substantial battery storage, are typically idle for long periods of time such as evenings and weekends, etc. While the exemplary embodiment of FIG. 2 shows a separate inverter system 282 connected to the intelligent energy source monitoring and selection control system 210, in other embodiments, the EV charging station 224 comprises an integrated inverter system which is configured to generate covert DC power stored in the EV battery bank 292 into AC power, which is supplied to the AC power distribution panel 220 via the EV charging station 224.

In some embodiments, a public EV charging station, which is coupled to and utilizes multiple power sources (e.g., utility power and renewable power sources) for charging electric vehicles, can be designed to have an integrated intelligent energy source monitoring and selection control system which is configured to control the power sources that are used by the public EV charging station when charging electric vehicles. In such implementation, a control module of an electric vehicle can provide various status information and supporting functions to the integrated intelligent energy source monitoring and selection control system for charging an EV at a charging station, or otherwise. For example, depending on the amount of charge (e.g., 50% 75%, etc.) of a given electric vehicle and other status information as provided by the control mode of the electric vehicle, the integrated intelligent energy source monitoring and selection control system can selectively connect one or more power sources to the EV charging station to expedite the transfer of energy to the electric vehicle (e.g., more power for lower charged electric vehicles for faster charging time, or less power for higher charged electric vehicles, etc.). In addition, depending on the type of electric vehicle and needed charge time, the integrated intelligent energy source monitoring and selection control system can selectively connect one or more power sources to the EV charging station to provide, e.g., Level 1 charging, Level 2 charging, Level 3 charging, etc.

Figure 3:
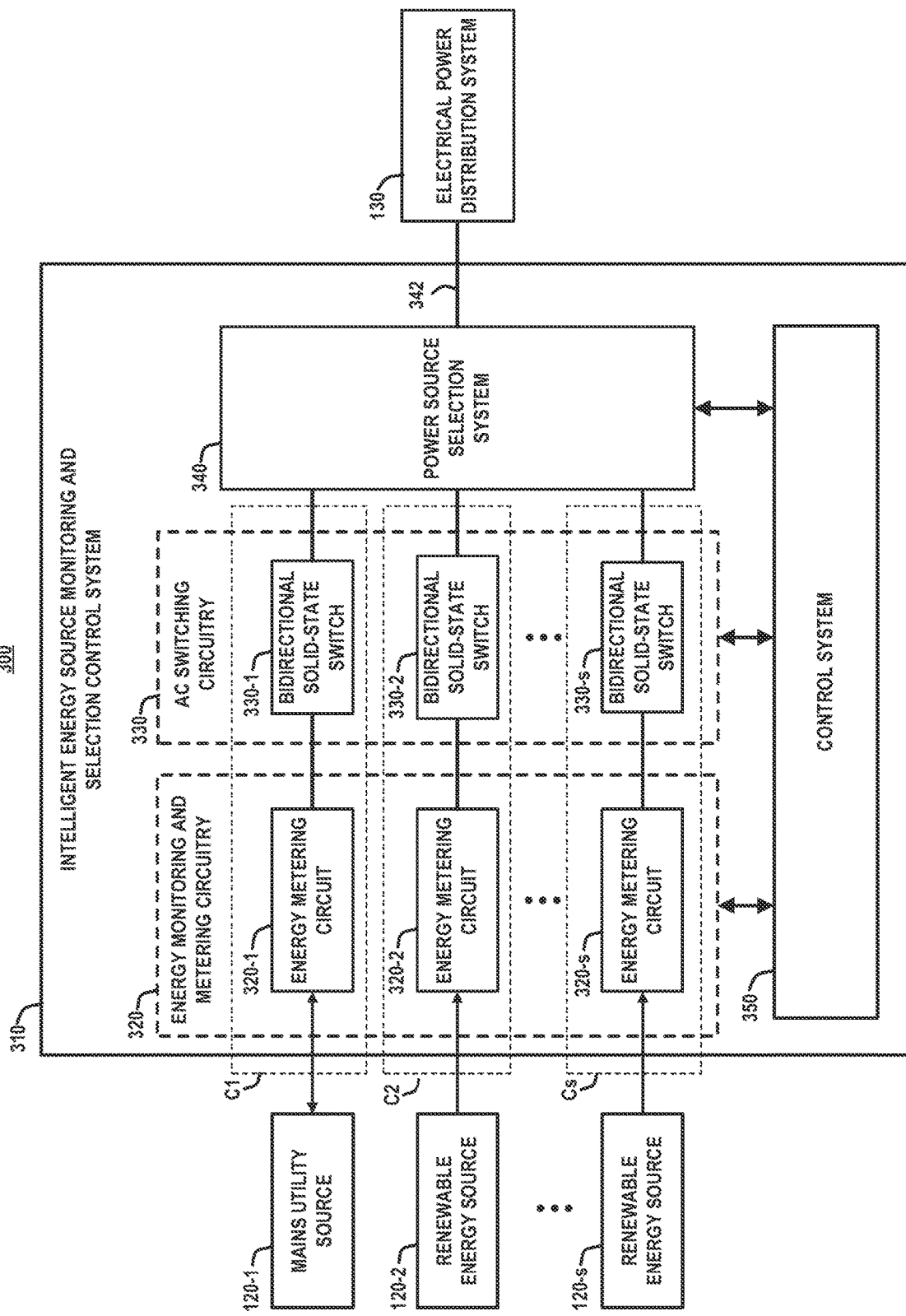
FIG. 3 schematically illustrates an intelligent energy source monitoring and energy source selection control system, according to an exemplary embodiment of the disclosure.

FIG. 3 schematically illustrates a multi-modal energy system 300 which implements an intelligent energy source monitoring and energy source selection control system, according to an exemplary embodiment of the disclosure. In particular, FIG. 3 schematically illustrates an exemplary architecture of an intelligent energy source monitoring and selection control system 310, which can be implemented in the exemplary multi-modal energy systems 100 and 200 of FIGS. 1 and 2. The intelligent energy source monitoring and selection control system 310 comprises energy monitoring and metering circuitry 320, AC switch circuitry 330, a power source selection system 340, and a control system 350. The intelligent energy source monitoring and selection control system 310 comprises a plurality of power supply channels C1, C2, . . . , Cs, wherein each power supply channel is configured to connect to a corresponding one of the power supply systems 120-1, 120-2, . . . , 120-s. The intelligent energy source monitoring and selection control system 310 further comprises at least one output channel 342 which connects an output of the power source selection system 340 to the electric power distribution system 130. The power source selection system 340 is coupled between the power supply channels C1, C2, . . . , Cs, and the power output channel 342.

The energy monitoring and metering circuitry 320 comprises a plurality of energy metering circuits 320-1, 320-2, . . . 320-s. The AC switch circuitry 330 comprises a plurality of bidirectional solid-state switches 330-1, 330-2, . . . , 330-s. As shown in FIG. 3, each power supply channel C1, C2, . . . , Cs is configured to connect a corresponding one of the energy sources 120-1, 120-2, . . . , 120-s (or power supply systems 120) to the power source selection system 340. Each power supply channel C1, C2, . . . , Cs comprises an associated energy metering circuit and bidirectional solid-state switch.

In some embodiments, energy monitoring and metering circuitry 320 is configured to monitor the power supply systems 120 that are connected to the intelligent energy source monitoring and selection control system 310 to determine the availability (presence or absence) of each power supply system 120 at any given time. For example, the energy monitoring and metering circuitry 320 is configured to determine whether a given power supply system 120 is available for use, or whether a given power supply system 120 is offline and not available at a given time, or if there is power outage of mains utility power, etc. In addition, the energy monitoring and metering circuitry 320 is configured to determine how much available power a given power supply system 120 can deliver at a given time, and monitor how power is transferred from the given power supply system 120 to the electrical power distribution system 130, and how much remaining power a given power supply system 120 has at any given time.

In some embodiments, the energy metering circuits 320-1, 320-2, . . . 320-s each comprise voltage sensors and current sensors, which are configured to determine the voltage and load current output levels from each power supply system 120, and utilize the determined voltage and load current levels to (i) determine power availability (presence or absence), (ii) determine an amount of available power that given power supply system 120 can supply at given time, and to (iii) generate energy usage data based on sensed load current flowing through each power delivery channel from the respective power supply system 120-1, 120-2, . . . , 120-s, through the intelligent energy source monitoring and selection control system 310, to electrical loads connected to the electrical power distribution system 130. In some embodiments, the energy metering circuits 320-1, 320-2, . . . , 320-s are configured to measure power and energy flow through the respective power supply channels C1, C1, . . . , Cs and process instantaneous voltage and current waveforms to compute RMS values of voltage and currents, active, reactive and apparent power and energies.

The energy monitoring and metering circuitry 320 generates and outputs metered information regarding power source availability and energy usage data to the control system 350 for analysis. The control system 350 stores and analyzes the energy metering data to determine energy availability and usage of the various power sources 120-1, 120-2, . . . , 120-s, and generates control signals to control the AC switching circuitry 330 and the power source selection system 340 to selectively connect one or more of the power supply systems 120-1, 120-2, . . . , 120-s to the electrical power distribution system 130. As explain in further detail below, in some embodiments, the control system 350 is configured to provide energy usage information for the different power supply systems 120-1, 120-2, . . . , 120-s to a remote computing node or device via powerline communication, or over wired or wired network connection via a transceiver. This configuration allows remote energy monitoring and notification of energy usage and thereby improves energy awareness for various applications. An exemplary embodiment of the control system 350 will be described in further detail below in conjunction with FIG. 6.

The AC switching circuitry 330 is configured to selectively connect or disconnect the power supply channels C1, C2, . . . , Cs to the power source selection system 340 in response to control signals output from the control system 350. In particular, the bidirectional solid-state switches 330-1, 330-2, . . . , 330-s are configured to (i) allow the bidirectional flow of load current to/from the respective power supply systems 120-1, 120-2, . . . , 120-s, through the intelligent energy source monitoring and selection control system 310, when the bidirectional solid-state switches 330-1, 330-2, . . . , 330-s are in a "switched-on state" and (ii) block the bidirectional flow of load current to/from the respective power supply systems 120-1, 120-2, . . . , 120-s, through the intelligent energy source monitoring and selection control system 310, when the bidirectional solid-state switches 330-1, 330-2, . . . , 330-s are in a "switched-off state." An exemplary embodiment of the solid-state bidirectional switches 330-1, 330-2, . . . , 330-s will be discussed in further detail below in conjunction with FIG. 5.

The power source selection system 340 is configured to selectively connect one or more of the power supply channels C1, C2, . . . , Cs to the electrical power distribution system 130 under control of the control system 350. In some embodiments, the power source selection system 340 comprises a multiplexer switching system which is configured to selectively connect one or more of the power supply channels C1, C2, . . . , Cs to the output channel 342 which feeds the electrical power distribution system 130. In this regard, the power source selection system 340 is intelligently operated under control of the control system 350 to connect one or more of the power supply systems 120-1, 120-2, . . . , 120-s to the electrical power distribution system 130 to provide power to electrical loads of the electrical power distribution system 130. In some embodiments, the power source selection system 340 is operated in conjunction with the AC switching circuitry 330 such that when a given power supply system 120 is not selected for use and the associated power supply channel is not coupled to the electrical power distribution system 130 through the power source selection system 340, the associated bidirectional solid-state switch of the power supply channel is deactivated to provide further isolation between the non-used power source and the electrical power distribution system 130. The bidirectional solid-state switches 330-1, 330-2, . . . , 330-s are further utilized to provide fast response times for disconnecting a given power supply channel from the input to the power source selection system 340 in instances where a power anomaly (e.g., excessive voltage, excessive load current, etc.) is detected by the energy monitoring and metering circuitry 320 of the given power supply channel. This provides a protection mechanism in which the control system 350 can deactivate a given bidirectional solid-state switch to quickly disconnect a given power source from the electrical power distribution system 130. In this configuration, it is assumed that faster response times for disconnecting power is achieved through the AC switching circuitry 330, as compared to the power source selection system 340.

Figure 4:
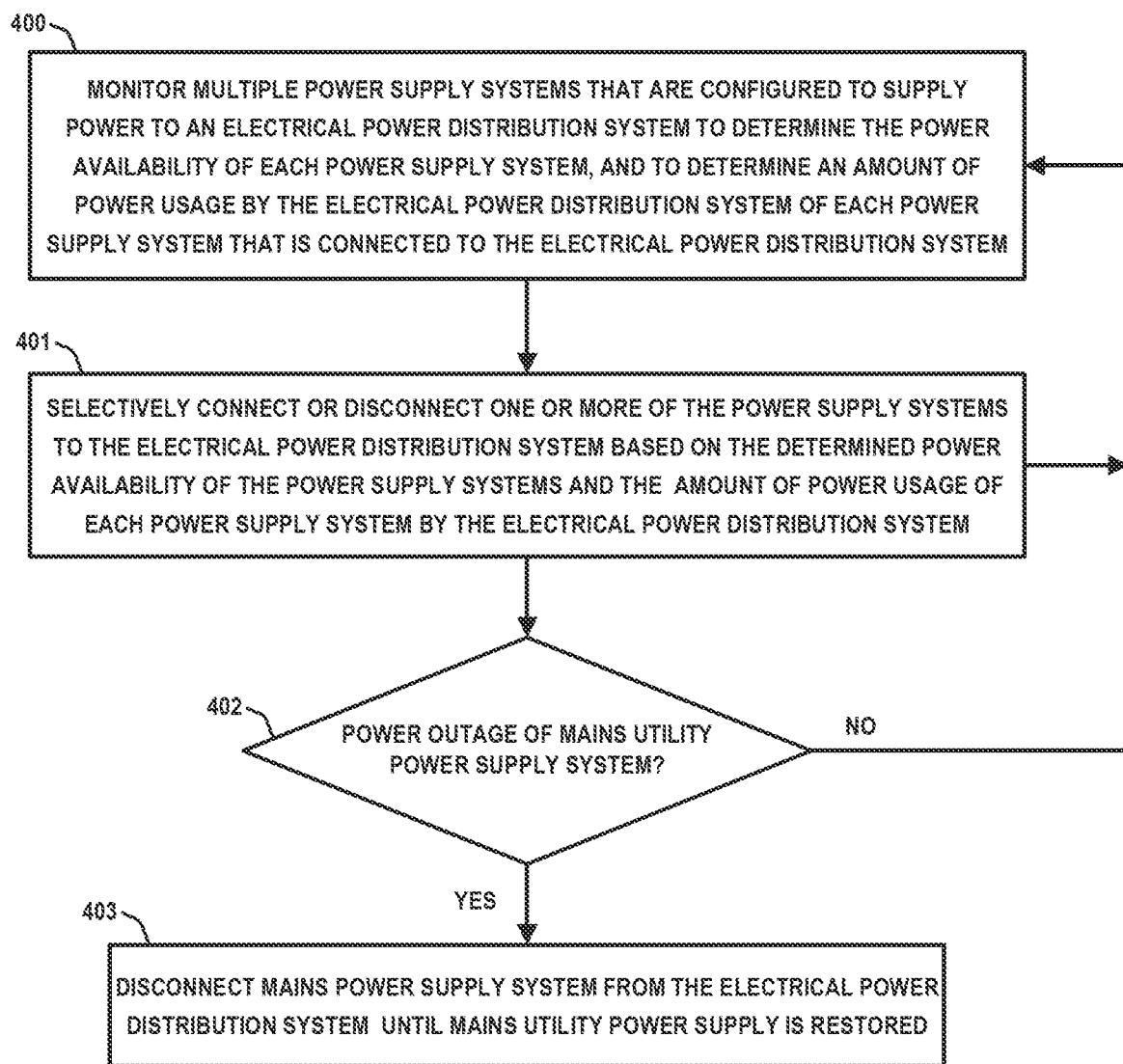
FIG. 4 is a flow chart of a method for performing intelligent energy source monitoring and energy source selection control, according to an exemplary embodiment of the disclosure.

The intelligent energy source monitoring and selection control system 310 is configured to intelligently control power delivery to the electrical power distribution system 130 by selective connection of one or more of the available power sources 120-1, 120-2, . . . , 120-s. The control system 350 is configured to execute software (e.g., proprietary software routines) for collecting and analyzing power usage data from the energy metering circuitry 320 for the different power supply channels, and to generate control signals that are applied to, e.g., the power source selection system 340 to control and manage power delivery from one or more of the power supply systems 120-1, 120-2, . . . , 120-s to the electric power distribution system 130. For example, FIG. 4 is a flow chart which illustrates a method for performing intelligent energy source monitoring and energy source selection control, according to an exemplary embodiment of the disclosure. In some embodiments, FIG. 4 illustrates an exemplary mode of operation of the intelligent energy source monitoring and selection control system 310 under the control of the control system 350.

Referring to FIG. 4, the intelligent energy source monitoring and energy source selection control system 310 monitors multiple power supply systems, which are configured to supply power to the electrical power distribution system 130, to determine a power availability of each power supply system, and to determine an amount of power usage by the electrical power distribution system 130 of each power supply system that is currently connected to the electrical power distribution system 130 (block 400). For example, as noted above, the energy monitoring and metering circuitry 320 is configured to determine, for each power supply channel, whether a power source of a given power supply system, which coupled to a given power supply channel, is available (e.g., present or not present) and a power availability of the power source (e.g., how much power can be supplied by the power source for a given period of time, such as kilowatt-hour, etc.). In addition, the energy monitoring and metering circuitry 320 is configured to determine how much power the electrical power distribution system 130 has consumed from a given power source connected to the electrical power distribution system 130, and how much remaining power the given power source has to supply to the electrical power distribution system 130.

Over time, the intelligent energy source monitoring and energy source selection control system 310 will selectively connect or disconnect one or more of the available power supply systems to the electrical power distribution system 130 based on the determined power availability of the power supply systems and the amount of power usage of each power source by the electrical power distribution system 130 (block 401). By way of example, assume that at some given period of time, the intelligent energy source monitoring and selection control system 310 is actively connecting a mains utility power source and a solar power source to the electrical power distribution system 130. Assume further that the intelligent energy source monitoring and selection control system 310 determines that the power availability of the solar power system has significantly decreased due to, e.g., cloud cover, or nightfall, but that the power availability of a wind power supply system has increased due to, e.g., an increase in wind. In this instance, the intelligent energy source monitoring and selection control system 310 can selectively disconnect the solar power system from the electrical power distribution system 130, while connecting the wind power system with the expectation that the wind power system will provide sufficient supply power to the electrical distribution system 130 to supplement or otherwise decrease the power demand on the utility grid.

The intelligent energy source monitoring and selection control system 310 performs the power availability/usage monitoring and selective connection/disconnection of the power sources on a continuous or periodic basis (loop control system of blocks 400 and 401). In instances when one or more of the renewable energy sources 120-2, ..., 120-$s$ comprises a "grid-connected" system which is configured to supply excess power back to the utility grid of the mains utility source 120-1, a protection mechanism is implemented by the intelligent energy source monitoring and selection control system 310 when a power outage of the mains utility power system is detected (affirmative determination in block 402). In such instance, the intelligent energy source monitoring and selection control system 310 will send control signals to the AC switching circuitry 330 and the power source selection system 340 to disconnect the mains utility source 120-1 from the electrical power distribution system 130 until the mains utility power supply is restored (block 403). This protection mechanism is implemented to ensure that no excess power from any of the grid-connected renewable power sources is supplied back to the utility grid until the mains utility outage condition is fixed and utility power is restored.

It is to be appreciated that the intelligent energy source monitoring and selection control system 310 is configured to perform functions such as (i) bidirectional current regulation, (ii) adaptive line synchronization between various power sources and loads, (iii) energy discrimination to pull power from the optimal and most effective energy source based on current circumstances (e.g., power outages, low battery level, periods of higher price use of utility power, lack of wind, lack of sunlight, etc.), (iv) combining power from multiple different energy sources simultaneously, (v) independent operation of different line voltages and number of phases, (vi) providing power source scalability, (vii) energy conditioning with line and load protection, and (viii) load demand optimization (e.g., EV charging optimization), etc.

In this regard, the intelligent energy source monitoring and selection control system 310 enables novel mechanisms for controlling power usage, power usage reporting that previously has not been possible. The intelligent energy source monitoring and selection control system 310 supports adaptive load synchronization between various types of grid power and various types loads through a single switching mechanism. The intelligent energy source monitoring and selection control system 310 is configured to determine the optimal type of power source(s) to be utilized as a given time, based on the downstream load demand, and to provide real-time instantaneous, or near real-time, response while recognizing the upstream power constraints from a variety of different power sources that are coupled to the intelligent energy source monitoring and selection control system 310.

Moreover, the intelligent synchronization between the different power sources allows for multiple sources of power to be utilized simultaneously. By way of example, for a given operating condition, the intelligent energy source monitoring and selection control system 310 may control the power supply channel connections to different power sources to supply (i) 20% of power from solar power, (ii) 50% of power from a battery bank, and (iii) 30% of power from the utility grid. This intelligent control is made by the intelligent energy source monitoring and selection control system 310 based on, e.g., recognizing the availability and quality of power that is being supplied by the various energy sources 120-1, 120-2, ..., 120-$s$. In the example above, the intelligent energy source monitoring and selection control system 310 may have intelligently selected such percentages by recognizing that the solar power system was yielding lower returns in a specific timeslot where the cost of utility power is high. Therefore, the intelligent energy source monitoring and selection control system 310 will automatically recognize the optimal percentage of power that should be pulled from some or all of the available energy sources to sustain a given power demand of electrical loads of the electrical power distribution system 130.

In this regard, the intelligent energy source monitoring and selection control system 310 is configured to intelligently control a power demand response of a given electrical load on both a micro-level basis, and a macro-level basis where an intelligent power demand response is even more beneficial. In particular, on a micro-level, consumers can utilize alternative forms of power generation through solar power or wind power in order to power their homes. The time when solar power or wind power needs to be utilized may not be the same time when such power was generated. Therefore, as noted above, the solar power or wind power can be generated and stored in a battery bank for access at some subsequent time, which maximizes the amount of harvested energy that can utilized. The intelligent energy source monitoring and selection control system 310 controls the supply of power by the different power sources to the electrical power distribution system 130 in an intelligent manner to decrease an overall use of utility power and, thereby, decrease an amount of energy purchased from the utility company, the cost of which has become very expensive in regions throughout the world.

On a macro-level, the ability to manage power usage on the grid is very challenging. This problem exists in developed countries wherein there is a continuous increase in the number of power devices that are in use, as well as underdeveloped countries that are currently building power infrastructure. Managing demand and seasonal peaks is crucial in order to maintain grid integrity and reliability. On a macro-level, peak power demands create significant strains on the grid especially in specific seasons and at certain times of day. In this regard, the intelligent energy source monitoring and selection control system 310 can be leveraged to efficiently and effectively smooth out these power demand peaks and valleys by interconnecting a large network of intelligent energy source monitoring and selection control systems in buildings connected to a utility grid to determine what types of power sources are available, what the current status is of these sources and what is the current demand within any given building. Through the aggregation of this data, the intelligent energy source monitoring and selection control systems are able to drive better decision making on the micro-level to have drastic effects on the macro utility grid. Indeed, through proactive insights into demand and recognition of power sources on a building level, intelligent energy source monitoring and selection control systems according to exemplary embodiments of the disclosure, which are implemented by other buildings on the same grid, can understand and react accordingly. This, in turn, will smooth out peak demand fluctuations and also smooth out the quality of power that is delivery to a building, e.g., residential home.

The process of switching a building between "on-grid" and "off-grid" creates fluctuations on the utility grid. In large quantities, such fluctuations become quite noticeable and lead to issues with "clean power." This is especially a significant issue in underdeveloped countries. The intelligent energy source monitoring and selection control system 310 is configured to drastically reduce such fluctuations on the grid by ramping utility power up and down in relatively small increments, instead binary off/on switching. This will allow utility companies to effectively manage utility power during peak demands and also provide clean, stable utility power to their consumers.

Figure 5:
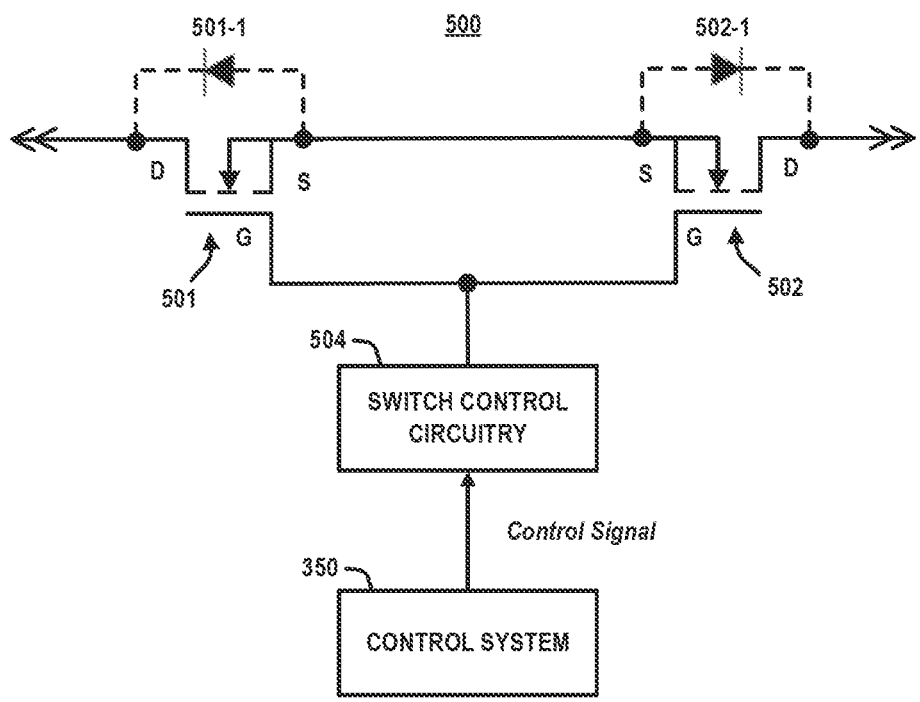
FIG. 5 schematically illustrates a bidirectional solid-state switch that is implemented in an intelligent energy source monitoring and energy source selection control system, according to an exemplary embodiment of the disclosure.

FIG. 5 schematically illustrates a bidirectional solid-state switch 500 that is implemented in an intelligent energy source monitoring and energy source selection control system, according to an exemplary embodiment of the disclosure. The bidirectional solid-state switch 500 comprises a first switch 501 and a second switch 502 connected back-to-back in series, and associated switch control circuitry 504. In some embodiments, the first and second switches 501 and 502 comprise power metal-oxide-semiconductor field-effect transistor (MOSFET) devices and, in particular, N-type enhancement MOSFET devices, having gate terminals (G), drain terminals (D), and source terminals (S) as shown.

As further shown in FIG. 5, the first and second switches 501 and 502 comprise intrinsic body diodes 501-1 and 502-1, respectively, where each body diode represents a P-N junction between a P-type substrate body to an N-doped drain region of the MOSFET devices. The body diodes 501-1 and 502-1 are intrinsic elements of the MOSFET switches 501 and 502 (i.e., not discrete elements) and, thus, are shown with dashed-line connections. It is to be noted that the intrinsic body-to-source diodes of the first and second switches 501 and 502 are not shown as they are shorted out by the connections between the source regions and the substrate bodies (e.g., N+ source and P-doped body junction are shorted through source metallization).

The switch control circuitry 504 is configured to generate a gate control signal that is applied to the gate terminals of the first and second MOSFET switches 501 and 502 to place the solid-state bidirectional switch 500 into a switched-on state or a switched-off state. In particular, during operation of the intelligent energy source monitoring and selection control system 310, control system 350 will output control signals to the switch control circuitry 504 to activate or deactivate the bidirectional switch device 500. For example, in response to a switch activation control signal from the control system 350, the switch control circuitry 504 generates a gate voltage to the gate terminals of the first and second MOSFET switches 501 and 502 to activate the switches and place the solid-state bidirectional switch 500 in a switched-on state, which allows the bidirectional flow of AC current on a given power supply channel of the intelligent energy source monitoring and selection control system 310 between a given energy source and a given load, when the power supply channel is selected for connection to the given load by operation of the power source selection system 340. On the other hand, in response to a switch deactivation control signal from the control system 350, the switch control circuitry 504 disconnects the gate voltage from the gate terminals of the first and second MOSFET switches 501 and 502 to thereby deactivate the switches and place the solid-state bidirectional switch 500 in a switched-off state. The switched-off state of the bidirectional switch 500 prevents the bidirectional flow of AC current on a given power supply channel of the intelligent energy source monitoring and selection control system 310 between a given energy source and a given load, event when the power supply channel is connected to the given load by operation of the power source selection system 340.

Figure 6:
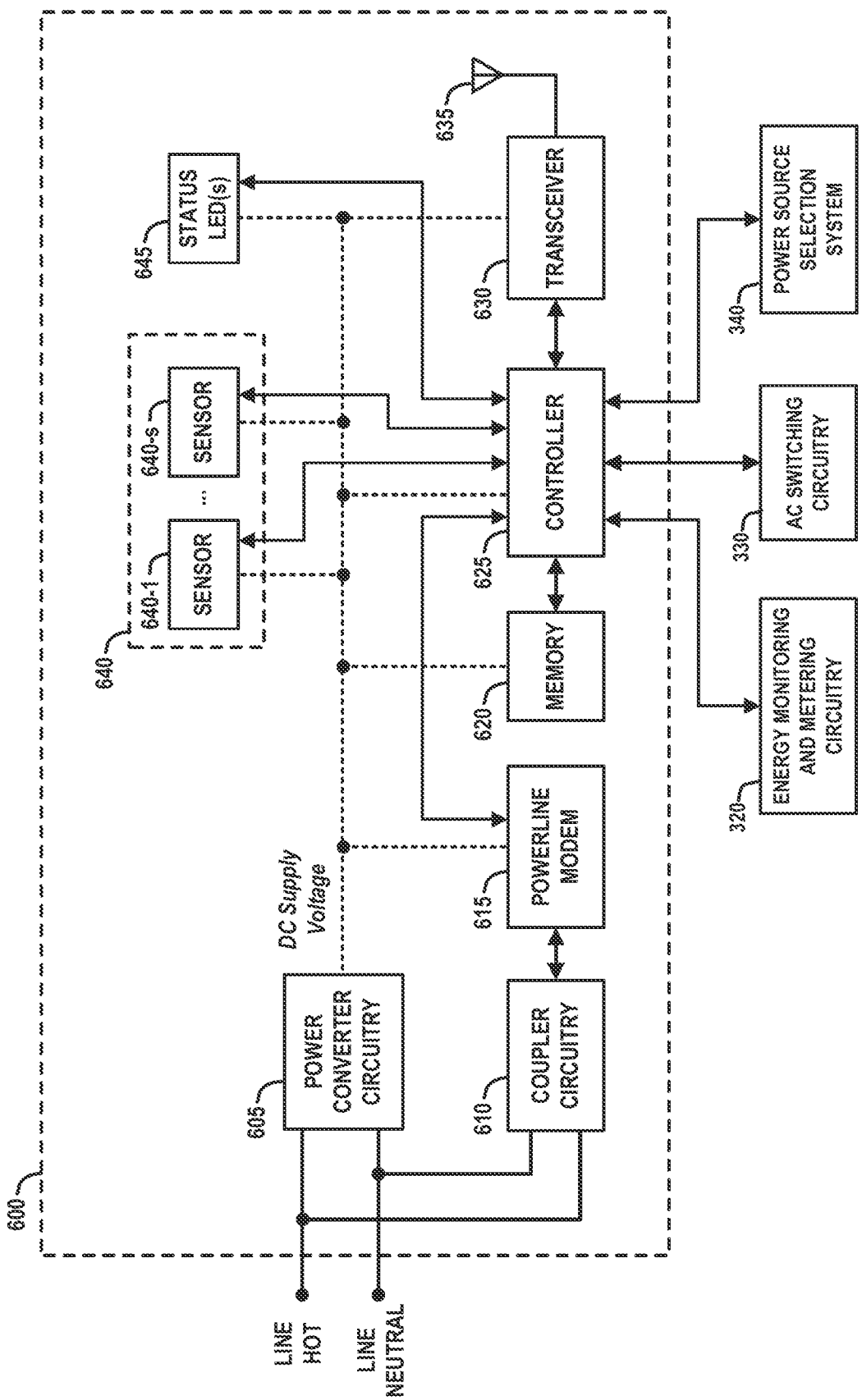
FIG. 6 schematically illustrates a control system of an intelligent energy source monitoring and energy source selection control system, according to an exemplary embodiment of the disclosure.

FIG. 6 schematically illustrates a control system of an intelligent energy source monitoring and energy source selection control system, according to an exemplary embodiment of the disclosure. In particular, in some embodiments, FIG. 6 schematically illustrates an exemplary architecture of a control system 600 which can be implemented to control operations of, e.g., the intelligent energy source monitoring and energy source selection control system 310 (FIG. 3), according to an exemplary embodiment of the disclosure. The control system 600 comprises a power converter circuit 605, a powerline coupler circuit 610, a powerline modem 615, a memory device 620, a controller 625, a transceiver 630, an antenna 635, a plurality of sensors 640-1, . . . , 640-$s$ (collectively, sensors 640), and one or more status light-emitting diodes (LEDs) 645.

The power converter circuitry 605 is coupled to a hot power line and a neutral power line, and is configured to convert AC supply power, which is applied to the hot and neutral power lines, into a direct current (DC) supply voltage to power the circuitry and components of the control system 600, and other circuitry of the intelligent energy source monitoring and energy source selection control system 310. The controller 625 is configured to control and manage the energy monitoring and switching functions of the intelligent energy source monitoring and energy source selection control system 310. In some embodiments, the controller 625 comprises a microprocessor, a microcontroller, an application-specific integrated circuit (ASIC), a field-programmable gate array (FPGA), or another type of programmable device, which is configured to implement control functions as described herein. In some embodiments, the controller 625 comprises internal cache memory, e.g., volatile random-access memory (RAM) such as static RAM, and an internal non-volatile flash memory to store program code (e.g., firmware) which is executed by the controller 625 to control and manage the energy monitoring and switching functions of the intelligent energy source monitoring and energy source selection control system 310. In addition, the internal memory of the controller 625 can store configuration data which is utilized for provisioning the functions and operation of the energy monitoring and switching functions of the intelligent energy source monitoring and energy source selection control system 310.

In some embodiments, the memory device 620 comprise a non-volatile memory device, such as a flash memory device, an SSD (solid state drive) device, or other types and combinations of non-volatile memory devices, which are suitable for the given application. The memory device 620 is utilized for various purposes including, but not limited to, storing program code which is executed by the controller 625, persistently storing an operating state of the intelligent energy source monitoring and energy source selection control system 310, persistently storing metering data and power usage data that is locally collected by the intelligent energy source monitoring and energy source selection control system 310, or which is received from remote network node, and providing local persistent storage for other purposes, as needed. The memory device 620 which stores program code for execution by the controller 625 or processor is an example of what is more generally referred to herein as a processor-readable storage medium having program code embodied therein, and may comprise, for example, electronic memory such as SRAM, DRAM or other types of random-access memory, read-only memory (ROM), flash memory, magnetic memory, optical memory, or other types of storage devices in any combination. Articles of manufacture comprising such processor-readable storage media are considered embodiments of the invention. The term "article of manufacture" as used herein should be understood to exclude transitory, propagating signals.

The sensors 640 are configured to provide various sensing modalities for detecting and capturing different types of relevant data in a given environment. For example, in some embodiments, the sensors 640 include a temperature sensor which is configured to detect ambient temperature of the environment, a humidity sensor which is configured to detect a humidity level of the environment, gas sensors that are configured to sense hazardous environmental conditions such as, e.g., the presence of a hazardous chemical, the presence of a hazardous explosive gas, etc. and other types of sensors that are configured to detect hazardous conditions, which would warrant the controller 625 to output control signals to the AC switching circuitry 330 and/or the power source selection system 340 so that the intelligent energy source monitoring and energy source selection control system 310 could effectively disconnect the power supply systems from the electrical power distribution system 130.

In some embodiments, the transceiver 630 comprises a wireless transceiver which is configured to enable wireless network communication with remote nodes, remote computing devices and systems. The transceiver 630 can implement proprietary or standard wireless communication protocols. For example, the transceiver 630 can implement a standard wireless communication protocol such as Wi-Fi®, near-field communication (NFC), Bluetooth®, Bluetooth Low Energy (BLE), or ZigBee®, and other types of standards-based wireless mesh networks. In some embodiments, the antenna 635 comprises whip antenna or any other type of antenna system or device which is suitable for the given application. In some embodiments, the transceiver 630 comprises an interface for wired network communication (e.g., Ethernet, or other IP-based communication protocol) with remote nodes, remote computing devices and systems. In all embodiments, the transceiver 630 is configured to transmit metering and power usage information, which is collected or otherwise computed by the controller 625, and other information regarding the power availability of each power supply system connected to the intelligent energy source monitoring and energy source selection control system 310 and the determined amount of power usage by the electrical power distribution system, to a remote node or system over a wired or wireless network connection.

In other embodiments, the powerline modem 615 and the powerline coupling circuitry 610 are configured to implement a powerline communication system which enables data to be sent from, and received by, the intelligent energy source monitoring and energy source selection control system 310 over (i) the utility grid of the mains utility system and/or (ii) the AC power distribution panel and the branch circuit wiring of the building, which are connected to the output of the intelligent energy source monitoring and energy source selection control system 310. The powerline communication system allows the controller 625 to transmit metering and power usage information, which is collected or otherwise computed by the controller 625, and other useful information, to a remote node or system over the powerline network. In addition, as explained in further detail below, the powerline communication system allows the intelligent energy source monitoring and energy source selection control system 310 for a given building to communicate with a remote energy traffic monitoring data center of, e.g., the utility mains power system, to provide power usage information which allows the mains utility to track and monitor power usage patterns over a wide area and more effectively manage power during peak demands and provide clean, stable power to their consumers.

In some embodiments, the powerline modem 615 implements any suitable broadband over powerline (BPL) protocol to enable the transmission of two-way data over existing medium voltage AC electrical distribution wiring networks, between transformers, and over existing low voltage AC electrical distribution wiring networks and building branch circuits. The powerline modem 615 implements a suitable modulation system which is configured for data modulation to transmit data over the powerline network to a remote node, and a suitable demodulation system which is configured for data demodulation to extract data received from a remote node over the powerline network. The powerline coupler circuitry 610 is configured to couple the input and output of the powerline modem 615 to the powerlines (line/neutral) using known techniques.

In some embodiments, the status LEDs 645 include one or more individual LED devices that are configured to illuminate in response to control signals received from the controller 625 to indicate an operating status the intelligent energy source monitoring and energy source selection control system 310. The status LEDs 645 can have different colors (e.g., red, green, yellow, blue, etc.) and/or have different illumination patterns (e.g., continuous, blinking, etc.) to represent different operational states. For example, in some embodiments, the status LEDs 645 can have an LED associated with each power supply channel of the intelligent energy source monitoring and energy source selection control system 310 that which emit different colors (e.g., green "on", red "off") to indicate whether or not a given power supply channel is active. Other LEDs can be implemented to visually display an alarm condition (e.g., overheating, existence of hazardous environment, etc.

Figure 7:
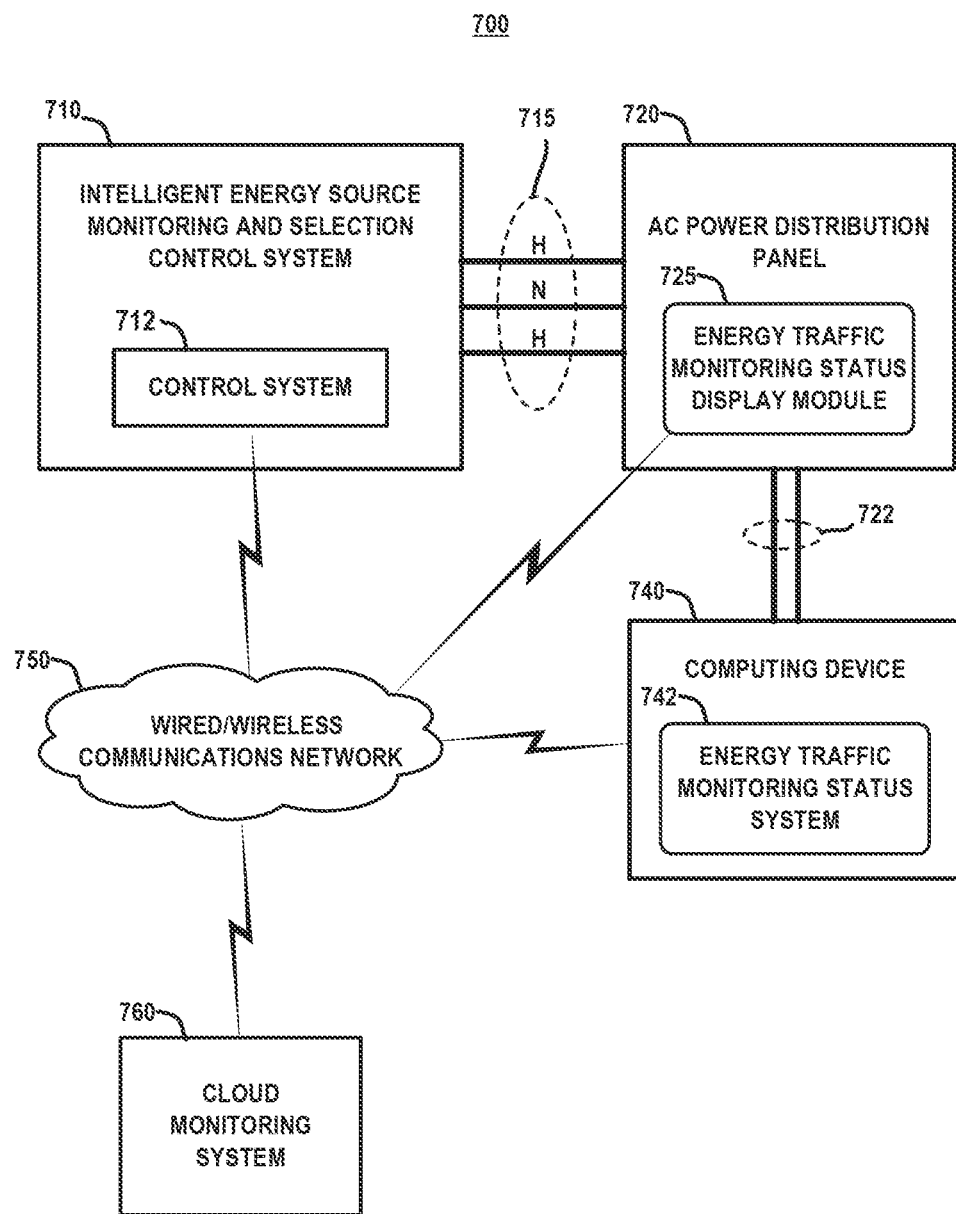
FIG. 7 schematically illustrates a system for remote monitoring and management of an intelligent energy source monitoring and energy source selection control system, according to an exemplary embodiment of the disclosure.

FIG. 7 schematically illustrates a system for remote monitoring and management of an intelligent energy source monitoring and energy source selection control system, according to an exemplary embodiment of the disclosure. More specifically, FIG. 7 schematically illustrates a system 700 which comprises an intelligent energy source monitoring and selection control system 710 and associated control system 712, and an AC power distribution panel 720 which is connected to an output of the intelligent energy source monitoring and selection control system 710 using a power supply cable 715 (which comprises a two hot lines (H) and a neutral line (N) and a bare metal ground line (not shown). The AC power distribution panel 720 comprises an energy traffic monitoring status display module 725. The system 700 further comprises a computing device 740, a communications network 750, and a cloud monitoring system 760. The computing device 740 comprises an energy traffic monitoring status system 742. The computing device 740 is supplied power from the power distribution panel 720 by a branch circuit 722 to which the computing device 740 is connected. The computing device 740 can be a desktop computer, a laptop computer, a computer server, a mobile computing device, etc.

In some embodiments, the intelligent energy source monitoring and selection control system 710 comprises an apparatus which comprises a system housing (e.g., a metallic housing) which contains the power metering circuitry, the AC switching circuitry, the power source selection system, the control system, and all the requisite wiring and electrical power buses to implement the power supply channels and to connect multiple power supply systems to an electrical power distribution system through the intelligent energy source monitoring and selection control system 710. In some embodiments, the intelligent energy source monitoring and selection control system 710 is disposed in a location of a building or power distribution system which is not readily accessible by customers.

In this instance, in some embodiments, the control system 712 of the intelligent energy source monitoring and selection control system 710 utilizes a transceiver (e.g., wired or wireless) to transmit metering data, power availability data, power usage information, and other useful information, etc., which is collected or otherwise computed by the control system 712, to one or more of the energy traffic monitoring status display module 725 of the AC power distribution panel 720, the energy traffic monitoring status system 742 (e.g., an application which executes on the computing device 740), and the cloud monitoring system 760, over the communications network 750. The communications network 750 comprises any combination of known wired and/or wireless communication networks such as, a global computer network (e.g., the Internet), a wide area network (WAN), a local area network (LAN), a satellite network, a telephone or cable network, a cellular network, a wireless network such as Wi-Fi or WiMAX, Bluetooth, or various portions or combinations of these and other types of networks. In this exemplary embodiment, any one of the systems 725, 740, and/or 750 can be configured and utilized for data processing, data storage, and/or data management of the metering data, power availability data, power usage information, and other useful information, etc., which is collected or otherwise computed by the control system 712 of the intelligent energy source monitoring and selection control system 710.

In other embodiments, when the control system 712 of the intelligent energy source monitoring and selection control system 710, the power distribution panel 720, and the computing device 740 implement a powerline modem and powerline coupler for powerline communication, the control system 712 can transmit the metering data, power availability data, power usage information, and other useful information, etc., which is collected or otherwise computed by the control system 712, to the energy traffic monitoring status display module 725 of the AC power distribution panel 720, and the energy traffic monitoring status system 742 via the powerline wiring 715 and 722.

Figure 8:
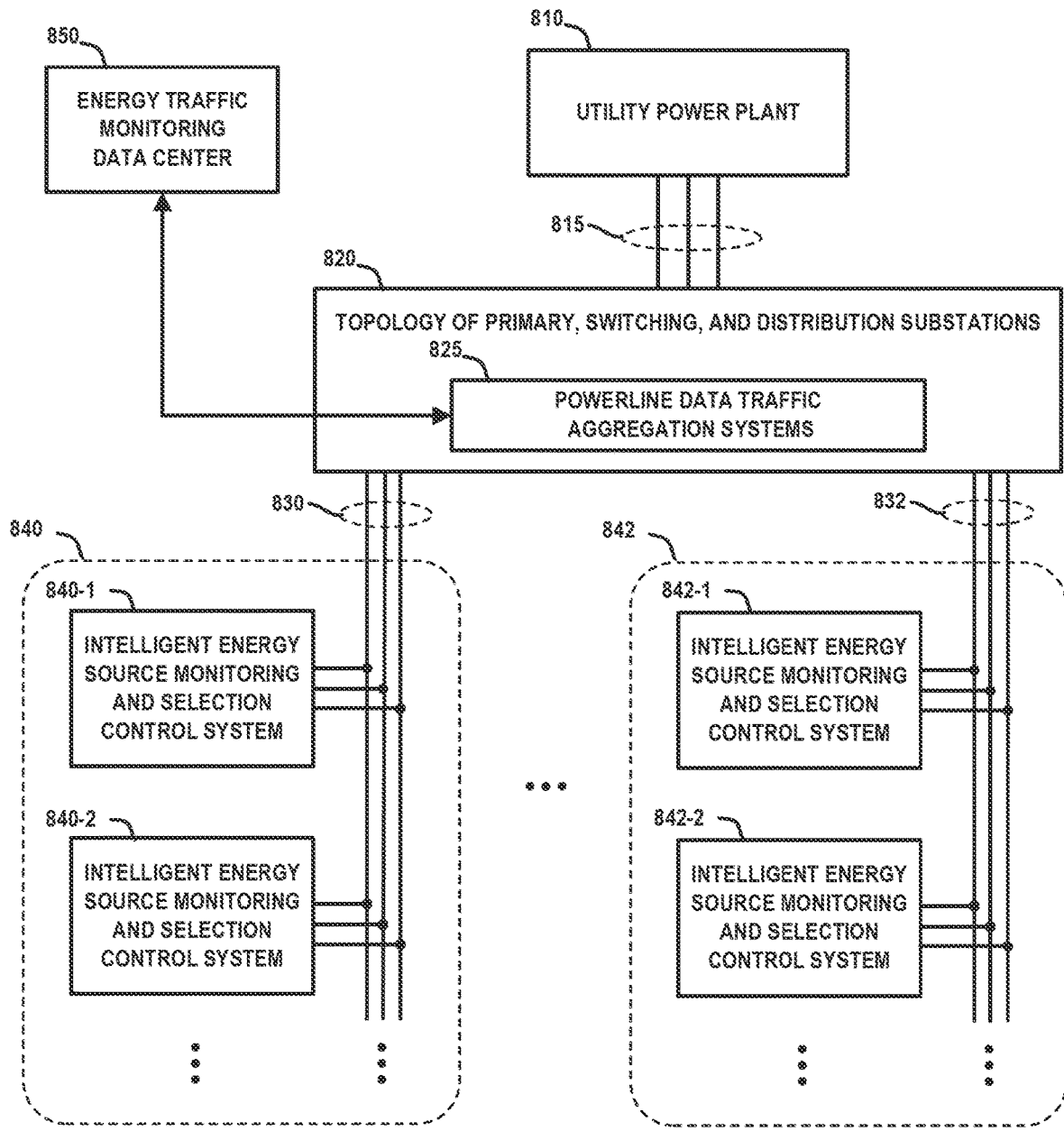
FIG. 8 schematically illustrates a system for remote monitoring and management of an intelligent energy source monitoring and energy source selection control system, according to another exemplary embodiment of the disclosure.

FIG. 8 schematically illustrates a system for remote monitoring and management of an intelligent energy source monitoring and energy source selection control system, according to another exemplary embodiment of the disclosure. More specifically, FIG. 8 schematically illustrates a system 800 which enables a utility company to monitor power usage over a wide area of power distribution system by leveraging a plurality of network-connected intelligent energy source monitoring and selection control systems that are utilized in various buildings that are connected to the utility grid of the power utility component. As schematically illustrated in FIG. 8, the system 800 comprises a utility power plant 810, a network of high-voltage primary transmission lines 815, a topology of primary, switching, and distribution substations 820, a network of secondary, medium voltage transmission lines 830 and 832 which feed different utility grids 840 and 842, a plurality of a plurality of intelligent energy source monitoring and selection control systems 840-1, 840-2, . . . which are connected to the utility grid 840, a plurality of intelligent energy source monitoring and selection control systems 842-1, 842-2, . . . which are connected to the utility grid 842, and an energy traffic monitoring data center 850 which is run and operated by the utility company.

In the exemplary embodiment of FIG. 8, it may be assumed that each grid 840 and 842 is configured to distribute power to different towns or regions, or multiple towns or regions, etc., depending on the how the utility grids 840 and 842 are configured. In addition, in the exemplary embodiment of FIG. 8, the intelligent energy source monitoring and selection control systems 840-1, 840-2, 842-1, 842-2, etc. are configured for powerline communication (e.g., broadband powerline communication) over the medium voltage wiring 830 and 832, and the low voltage wiring (e.g., service lines, or service drops) which supply utility power to the buildings and other structures which are connected to the utility grid.

As further shown in FIG. 8, the substations 820 implement powerline data traffic aggregation systems 825 which are configured to collect power usage information transmitted from the intelligent energy source monitoring and selection control systems 840-1, 840-2, 842-1, 842-2 from the various utility grids 840, 842 (and other grids, not shown) over the low and medium voltage powerlines, etc. The powerline data traffic aggregation systems 825 are network connected (e.g., WAN, LAN, Internet, etc.) to the energy traffic monitoring data center 850. The system 800 allows the utility mains power system to collect power usage information over vast regions of the utility grid, and thereby track and monitor power usage patterns over a wide area and more effectively manage power during peak demands and also provide clean, stable power to their consumers. In addition, the system 800 allows the utility mains power system to detect for the beginning phases of power outages in the different grids 840 and 842, and thereby enable reconfiguration of the substation topology (via controlling switching stations) to redirect some mains power from one grid to another to mitigate potential widespread power outages, etc. Further, the system 800 allows the utility mains power system to provide power usage information, and other useful information (via the energy traffic monitoring data center 850) to the powerline network-connected intelligent energy source monitoring and selection control systems 840-1, 840-2, 842-1, 842-2 connected to the various utility grids 840 and 842, which allows the intelligent energy source monitoring and selection control systems 840-1, 840-2, 842-1, 842-2 to perform intelligent power supply management operations based on the received information to thereby effectively manage power during peak demands, etc.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a utility power distribution system comprising distribution grids configured to distribute utility power to electrical power distribution systems of buildings;
   a plurality of intelligent energy source monitoring and selection control systems each coupled to a respective electrical power distribution system, wherein each intelligent energy source monitoring and selection control system is configured to selectively control a connection of the utility power and one or more renewable power sources to the respective electrical power distribution system, and determine an amount of power usage by the respective electrical power distribution system of the utility power and of the one or more renewable power sources; and
   an energy monitoring system which is coupled to the utility power distribution system, wherein the energy monitoring system is configured to collect power usage information from the plurality of intelligent energy source monitoring and selection control systems, to process the collected power usage information to monitor power usage patterns over at least a portion of each of one or more of the distribution grids of the utility power distribution system, and to control the distribution of utility power based on the monitored power usage patterns.

2. The system of claim 1, wherein the intelligent energy source monitoring and selection control systems are configured to transmit the power usage information to the energy monitoring system over powerlines.

3. The system of claim 1, wherein the energy monitoring system is configured to process the collected power usage information to control switching substations of a plurality of substations of the utility power distribution system to configure a topology of the substations for controlling the distribution of utility power to the distribution grids.

4. The system of claim 1, wherein the intelligent energy source monitoring and selection control systems are configured to receive power usage information from the energy monitoring system and process the received power usage information to perform intelligent power management operations based on the received power usage information.

5. The system of claim 4, wherein the intelligent power management operations comprise limiting the use of utility power during peak utility power demands.

6. The system of claim 4, wherein the intelligent power management operations comprise selectively connecting and disconnecting one or more of the utility power and the renewable power sources to the respective electrical power distribution systems based at least in part on the received power usage information.

7. The system of claim 1, wherein each intelligent energy source monitoring and selection control system comprises:
   a housing unit comprising a control system, a plurality of power supply channels coupled to respective power sources comprising the utility power and the one or more renewable power sources, and a power output channel coupled to the respective electrical power distribution system;
   wherein the control system comprises control circuitry which is configured to (i) monitor each power source to determine a power availability of each power source, (ii) determine the amount of power usage by the respective electrical power distribution system of the utility power and the one or more renewable power sources, and (iii) selectively connect and disconnect one or more of the power sources to and from the respective electrical power distribution system based on the determined power availability of the power sources and the determined amount of power usage by the respective electrical power distribution system of the utility power and the one or more renewable power sources.

8. The system of claim 7, wherein in monitoring each power source to determine a power availability of each power source, the control system of the intelligent energy source monitoring and selection control system is configured to determine a presence or absence of available power of each power source, and to determine an amount of power that can be supplied by each power source for a given time period.

9. The system of claim 7, wherein the control system of each intelligent energy source monitoring and selection control system comprises a processor which is configured to execute software code to intelligently control functions of the control system.

10. A system, comprising:
    a utility power distribution system comprising a plurality of utility substations configured to distribute utility power to respective distribution grids, wherein each distribution grid is configured to distribute utility power to a plurality of electrical power distribution systems of buildings which are connected to the distribution grid;
    a plurality of intelligent energy source monitoring and selection control systems each coupled to a respective electrical power distribution system of a building that is connected to least one distribution grid, wherein each intelligent energy source monitoring and selection control system is configured to selectively control a connection of the utility power and one or more renewable power sources to the respective electrical power distribution system, and determine power usage by the respective electrical power distribution system of the utility power and of the one or more renewable power sources; and
    an energy information aggregation system operating on at least one utility substation coupled to the at least one distribution grid, wherein the energy information aggregation system is configured to collect power usage information from the plurality of intelligent energy source monitoring and selection control systems coupled to the respective electrical power distribution systems of the buildings connected to the least one distribution grid, and transmit the collected power usage information to an energy monitoring data center.

11. The system of claim 10, wherein the intelligent energy source monitoring and selection control systems are configured to transmit the power usage information to the energy information aggregation system over powerlines.

12. The system of claim 10, wherein the energy monitoring data center is configured to process the collected power usage information to monitor power usage patterns over the utility power distribution system and control distribution of utility power by the utility power distribution system.

13. The system of claim 10, wherein the energy monitoring data center is configured to process the collected power usage information to control switching substations of the plurality of utility substations to configure a topology of the utility substations for distributing the utility power to the distribution grids.

14. The system of claim 10, wherein the intelligent energy source monitoring and selection control systems are configured to receive power usage information from the energy monitoring data center and process the received power usage information to perform intelligent power management operations based on the received power usage information.

15. The system of claim 14, wherein the intelligent power management operations comprise limiting the use of the utility power during peak utility demands.

16. The system of claim 14, wherein the intelligent power management operations comprise selectively connecting and disconnecting one or more of the utility power and the renewable power sources to the respective electrical power distribution systems based at least in part on the received power usage information.

17. The system of claim 10, wherein each intelligent energy source monitoring and selection control system comprises:
a housing unit comprising a control system, a plurality of power supply channels coupled to respective power sources comprising the utility power and the one or more renewable power sources, and a power output channel coupled to the respective electrical power distribution system;
wherein the control system comprises control circuitry which is configured to (i) monitor each power source to determine a power availability of each power source, (ii) determine the amount of power usage by the respective electrical power distribution system of the utility power and the one or more renewable power sources, and (iii) selectively connect and disconnect one or more of the power sources to and from the respective electrical power distribution system based on the determined power availability of the power sources and the determined amount of power usage by the respective electrical power distribution system of the utility power and of the one or more renewable power sources.

18. The system of claim 17, wherein in monitoring each power source to determine a power availability of each power source, the control system of the intelligent energy source monitoring and selection control system is configured to determine a presence or absence of available power of each power source, and to determine an amount of power that can be supplied by each power source for a given time period.

19. The system of claim 7, wherein the control system of each intelligent energy source monitoring and selection control system comprises a processor which is configured to execute software code to intelligently control functions of the control system.

20. An apparatus, comprising:
a housing unit comprising a control system, a plurality of power supply channels configured for coupling to respective power sources comprising a utility power source and one or more renewable power sources, and a power output channel configured for coupling to an electrical power distribution system;
wherein the control system comprises control circuitry which is configured to (i) monitor each power source to determine a power availability of each power source, (ii) determine an amount of power usage by the electrical power distribution system of the power sources coupled to the power supply channels, (iii) selectively connect and disconnect one or more of the power sources to and from the respective electrical power distribution system based on the determined power availability of the power sources and the determined amount of power usage by the electrical power distribution system of utility power provided by the utility power source and of the one or more renewable power sources, and (iv) communicate with an energy monitoring system of a utility distribution system which comprises the utility power source, to receive power usage information from the energy monitoring system and process the received power usage information to perform intelligent power management operations based on the received power usage information.

* * * * *